United States Patent
Watkins et al.

(10) Patent No.: US 11,440,007 B2
(45) Date of Patent: Sep. 13, 2022

(54) ELECTRICAL SENSING, TRACKING, AND ACTUATION OF DROPLETS

(71) Applicant: Lawrence Livermore National Security, LLC, Livermore, CA (US)

(72) Inventors: Nicholas Watkins, Brentwood, CA (US); N. Reginald Beer, Pleasanton, CA (US); Melinda Simon, Fremont, CA (US)

(73) Assignee: LAWRENCE LIVERMORE NATIONAL SECURITY, LLC, Livermore, CA (US)

( * ) Notice: Subject to any disclaimer, the term of this patent is extended or adjusted under 35 U.S.C. 154(b) by 414 days.

(21) Appl. No.: 16/150,059

(22) Filed: Oct. 2, 2018

(65) Prior Publication Data
US 2020/0101456 A1 Apr. 2, 2020

(51) Int. Cl.
*B01L 3/00* (2006.01)
*B01J 19/00* (2006.01)

(52) U.S. Cl.
CPC ......... *B01L 3/50273* (2013.01); *B01L 3/5025* (2013.01); *B01J 19/0093* (2013.01)

(58) Field of Classification Search
CPC .... B01L 3/50273; B01L 3/5025; B01J 9/0093
See application file for complete search history.

(56) References Cited

U.S. PATENT DOCUMENTS 2,656,508 A 10/1953 Coulter
9,376,713 B2 6/2016 Bashir et al.

OTHER PUBLICATIONS

Sadeghi, Saman, et al. "On chip droplet characterization: a practical, high-sensitivity measurement of droplet impedance in digital microfluidics." Analytical chemistry 84.4 (2012): 1915-1923 and Supplementary 1-13. (Year: 2012).*
Accardo, Angelo, et al. "A combined ElectroWetting On Dielectrics superhydrophobic platform based on silicon micro-structured pillars." Microelectronic engineering 98 (2012): 651-654. (Year: 2012).*
(Continued)

*Primary Examiner* — Robert J Eom
(74) *Attorney, Agent, or Firm* — Perkins Coie LLP

(57) ABSTRACT

Devices, techniques, and processes are disclosed that use electrical impedance to detect of the presence and contents of droplets including cells, nucleic acids, proteins, or solute concentrations in an array of retrievable, trackable, trapped droplets in a fluidic system. Electrodes may be positioned underneath individual droplet traps in a microchannel to assay droplet contents and/or actuating droplets for the release of the droplets from corresponding traps. The disclosed technology may be used for detection of the results of solvent extraction processes including time-dependent quantification of metal ion concentration in the aqueous and organic phases, for wastewater treatment, heavy metal detection, pharmaceutical industry, and/or biotechnology, or for environmental monitoring of wastewater for toxic metal, monitoring of biological cell viability and proliferation, monitoring of extraction processes used in heavy metal mining, monitoring of extraction processes used in nuclear fuel processing, monitoring kinetics of enzyme processes, and/or assessing pharmacodynamics and drug efficacy.

25 Claims, 20 Drawing Sheets

(56) References Cited

OTHER PUBLICATIONS

Nejad, H. Rezaei, et al. "Characterization of the geometry of negative dielectrophoresis traps for particle immobilization in digital microfluidic platforms." Lab on a Chip 13.9 (2013): 1823-1830. (Year: 2013).*

Gawad, Shady, Laurent Schild, and P. H. Renaud. "Micromachined impedance spectroscopy flow cytometer for cell analysis and particle sizing." Lab on a Chip 1.1 (2001): 76-82. (Year: 2001).*

Chen, Nai-Chin, et al. "Single-cell trapping and impedance measurement utilizing dielectrophoresis in a parallel-plate microfluidic device." Sensors and Actuators B: Chemical 190 (2014): 570-577. (Year: 2014).*

Ambrico, M. et al., "Highly Sensitive and Practical Detection of Plant Viruses via Electrical Impedance of Droplets on Textured Silicon-Based Devices," Sensors, vol. 16, No. 11, p. 1946, 2016.

Coulter, W. H., "High speed automatic blood cell counter and size analyzer," Proc Natl Electron Conf. pp. 1034-1040, 1956.

Elbuken, C. et al., "Detection of microdroplet size and speed using capacitive sensors," Sensors Actuators, A Phys., vol. 171, No. 2, pp. 55-62, 2011.

Holmes, D., et al., "Leukocyte analysis and differentiation using high speed microfluidic single cell impedance cytometry," Lab Chip, vol. 9, No. 20, pp. 2881-2889, 2009.

Kemna, E. et al., "Label-free, high-throughput, electrical detection of cells in droplets.," Analyst, vol. 138, No. 16, pp. 4585-4592, 2013.

Lauterborn, W., "High-speed photography of laser-induced breakdown in liquids," Appl. Phys. Lett., vol. 21, No. 1, pp. 27-29, 1972.

Marcali, M. et al., "2016 Impedimetric detection and lumped element modelling of hemagglutination assay in microdroplets," Lab Chip, vol. 16, pp. 1-14, 2016.

McDonald, J., et al., "Poly (dimethylsiloxane ) as a Material for Fabricating Microfluidic Devices," Acc. Chem. Res., vol. 35, No. 7, pp. 491-499, 2002.

Moiseeva, E. et al., "Thin-film electrode based droplet detection for microfluidic systems," Sensors Actuators, B Chem., vol. 155, No. 1, pp. 408-414, 2011.

Sadeghi, S. et al., "On chip droplet characterization: A practical, high-sensitivity measurement of droplet impedance in digital microfluidics," Anal. Chem., vol. 84, No. 4, pp. 1915-1923, 2012.

Simon, M. et al., "Label-Free Detection of DNA Amplification in Droplets Using Electrical Impedance," in 15th International Conference on Miniaturized Systems for Chemistry and Life Sciences, 2011, pp. 1683-1685.

Sun, T., et al., "Single-colloidal particle impedance spectroscopy: Complete equivalent circuit analysis of polyelectrolyte microcapsules," Langmuir, vol. 26, No. 6, pp. 3821-3828, 2010.

Wu, T. et al., "Pulsed laser triggered high speed microfluidic fluorescence activated cell sorter," Proc. IEEE Int. Conf. Micro Electro Meeh. Syst., pp. 1097-1100, 2012.

Yesiloz, G., et al., "Label-free high-throughput detection and content sensing of individual droplets in microfluidic systems," Lab Chip, vol. 15, No. 20, pp. 4008-4019, 2015.

* cited by examiner

Provide an electrical signal at one or more predetermined frequencies to a first electrode of the microfluidic device, the first electrode positioned within a microfluidic channel configured to allow fluid including one or more droplets to pass through the microfluidic channel
2002

Sense electrical signals from at least a second electrode of the microfluidic device, the second electrode positioned within the microfluidic channel and configured to produce an electrical signal upon making physical contact with, or upon being in close proximity to, a first droplet
2004

Obtain at least one impedance value based on the sensed electrical signals
2006

Determine at least one characteristic of the first droplet based on the at least one impedance value
2008

FIG. 20

ELECTRICAL SENSING, TRACKING, AND ACTUATION OF DROPLETS

FEDERALLY SPONSORED RESEARCH OR DEVELOPMENT

The United States Government has rights in this invention pursuant to Contract No. DE-AC52-07NA27344 between the U.S. Department of Energy and Lawrence Livermore National Security, LLC, for the operation of Lawrence Livermore National Laboratory.

TECHNICAL FIELD

The present disclosure relates to detecting the contents and controlling the movement of droplets.

BACKGROUND

Microfluidic droplets provide advantages in heat and mass transport to conduct chemical and biological reactions. Typically, microfluidic systems rely on optical (e.g., fluorescence-based) methods to analyze reaction products in the microfluidic device, or instead transport the droplets out of the microfluidic device for offline analysis. Fluorescence-based detection methods suffer from common drawbacks such as their inherently qualitative nature, effects of pH, fluorophore concentration, and temperature on fluorescence intensity, and spectral overlap that limits the number of simultaneous measurements that can be made. These techniques also require steps to include labels in the system, which requires preparation, adds to the system expense, and potentially affects the function of biological entities. Such techniques are also dependent on the availability of a fluorescent label to detect the desired product. Frequently, the instrumentation used to detect fluorescence is bulky and expensive, requiring a light source, multiple filters, lenses and mirrors, and a detector. New techniques and devices are needed for detecting the contents of droplets.

SUMMARY

The disclosed technology overcome the above deficiencies and provide additional features and benefits in generation, sensing, sorting and manipulation of droplets in microfluidic devices by relying on electrical impedance values to, inter alia, detect the presence and contents of droplets.

One aspect of the disclosed technology relates to a microfluidic measurement device that includes a microfluidic device including a microfluidic channel configured to allow fluid including one or more droplets to pass through the microfluidic channel. The microfluidic device also includes a plurality of electrodes coupled to the microfluidic channel configured to make physical contact with, or to be in close proximity to, the one or more of the droplets, where at least a first electrode from the plurality of electrodes is configured to receive an electrical signal at one or more frequencies. The microfluidic measurement device also includes a detector coupled to the first electrode and at least a second electrode, where the detector is configured to sense electrical signals from the plurality of electrodes at the one or more frequencies, and to enable a determination of one or more impedance values associated with the sensed electrical signals.

Another aspect of the disclosed technology relates to a microfluidic device, that includes a microfluidic channel configured to allow fluid including one or more droplets to pass through the microfluidic channel, and a plurality of traps positioned in the microfluidic channel. Each trap is configured to trap a droplet and arrest the trapped droplet's movement, and is configured to allow the trapped droplet to make physical with or become close enough in proximity to be electrically detected by a first electrode and a second electrode in each trap. At least the first electrode is configured to receive an electrical signal at one or more frequencies. The microfluidic device also includes a detector that is coupled to at least the second electrode of each trap and is configured to sense electrical signals at the one or more frequencies from the one or more traps to enable a determination of one or more impedance values associated therewith.

The above and other aspects and features of the disclosed technology are described in greater detail in the drawings, the description and the claims.

BRIEF DESCRIPTION OF THE DRAWINGS

FIG. 20 depicts a set of operations for determining a droplet's characteristic in a microfluidic device, in accordance with some example embodiments.

DETAILED DESCRIPTION

Figure 1:
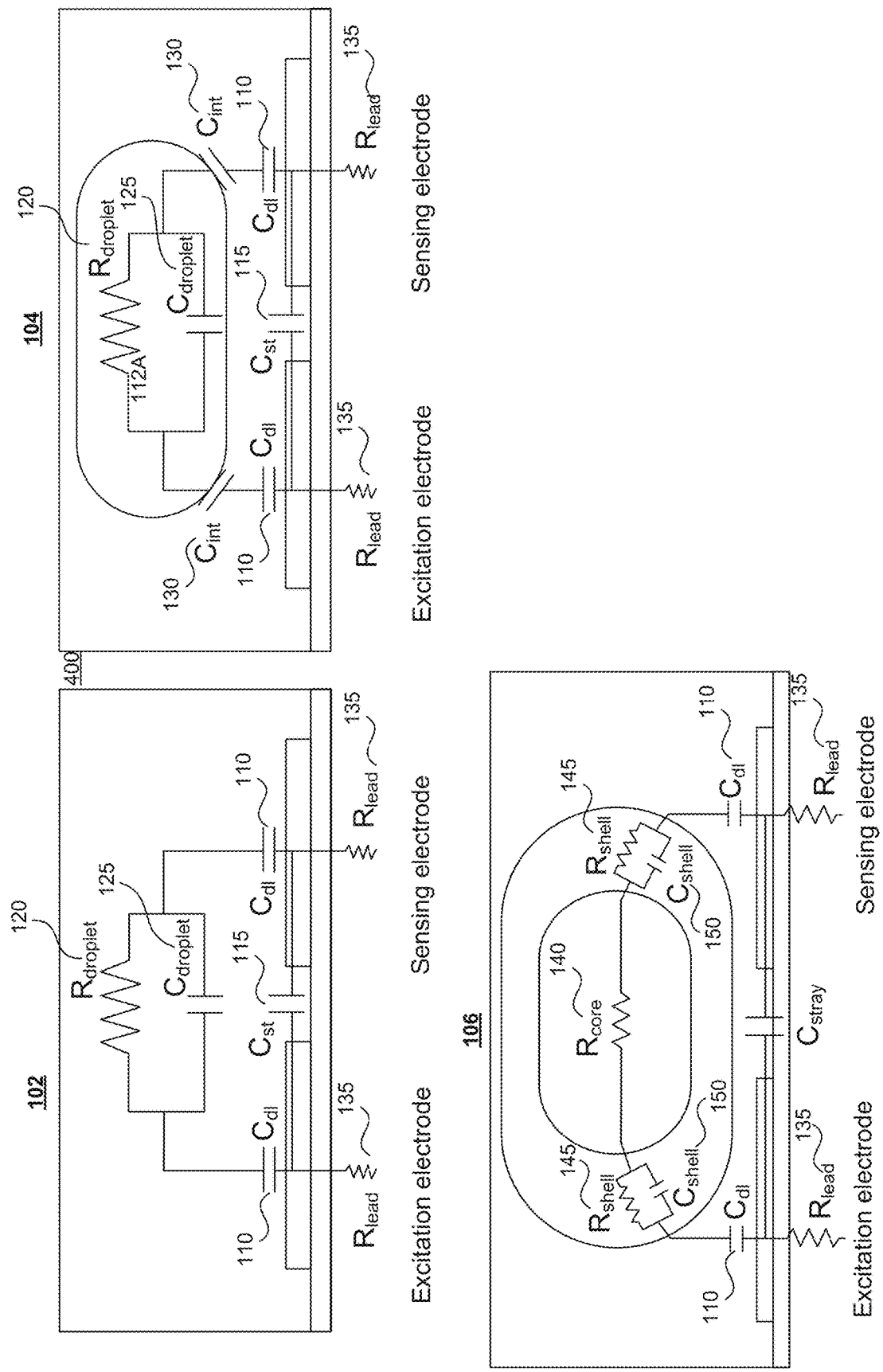
FIG. 1 depicts examples of equivalent circuits for droplets in a microchannel.

As noted earlier, some microfluidic systems transport droplets out of the microfluidic system for analysis using conventional analytical techniques, such as liquid chromatography-mass spectrometry (LC-MS) or inductively coupled plasma-mass spectrometry (ICP-MS). However, offline analysis of droplet contents still requires some preparation steps such as coalescence of the emulsion and separation of the immiscible phases, and can require dilution of the sample to an acceptable range for the analytical equipment. In addition, the low flow rates of microfluidic systems (nL-μL/min) can result in lengthy system run times to collect sufficient sample volume for analysis in conventional analytical equipment. These conditions add significantly to the time and labor required to analyze the results of a reaction.

The devices, techniques, methods, and processes disclosed in this patent document use electrical impedance to detect the presence and contents of droplets. As disclosed herein electrical impedance is used to detect the presence of cells, nucleic acids, proteins, or solute concentrations in an array of retrievable, trackable, and trapped droplets in a fluidic system such as a closed fluidic system. Electrodes may be positioned underneath individual droplet traps in a microchannel for the purpose of assaying droplet contents and/or actuating the one or more droplets for the release of the one or more droplets from one or more corresponding traps.

Example applications of the disclosed technology include detection of the results of solvent extraction processes including time-dependent quantification of metal ion concentration in the aqueous and organic phases. The disclosed subject matter may be used in wastewater treatment, heavy metal detection, pharmaceutical industry, and/or biotechnology. For example, the disclosed technology may be used for environmental monitoring of wastewater for toxic metal; monitoring of biological cell viability and proliferation; monitoring of extraction processes used in heavy metal mining; monitoring of extraction processes used in nuclear fuel processing and reprocessing; monitoring kinetics of enzyme processes; and/or assessing pharmacodynamics and drug efficacy.

In this disclosure, an electrical impedance-based sensor in a microfluidic system is disclosed with configurations including: (1) providing sensing or actuation of a droplet or droplet contents as droplets flow past a stationary electrical impedance sensor in a microchannel; and (2) providing sensing or actuation of a droplet or droplet contents that are stationary in a microfluidic structure, such as a trap.

Using an integrated sensor permits real-time sensing of ion concentration internal or external to the droplets in the microfluidic channel, and provides information on the progress of a chemical reaction or separation such as for solvent extraction. Electrodes can also be actuated to deliver energy within the droplets (e.g., electroporate cells within droplets) or to move the droplets.

Integrating multiple electrode sensing units onto the same chip provides time-dependent data on the progress of a reaction, enabling facile extraction of kinetic information (e.g., determination of mass transfer or enzymatic rate constants).

In the disclosed subject matter, electrical impedance is used to detect the presence and contents of droplets. The disclosed subject matter includes the use of electrical impedance to detect the presence of cells, nucleic acids, proteins, or solute concentrations in an array of retrievable, trackable, and trapped droplets in a closed fluidic system. Also disclosed is using electrodes positioned underneath individual droplet traps in a microchannel for assaying droplet contents and/or actuating the droplet for release from the trap.

In one aspect, the disclosed electrical impedance techniques and devices overcome the limitations of optical methods that are currently used to analyze reactions. For instance, the disclosed approach provides quantitative measurements, and is immune to the effects of variables such as pH, temperature, and label on the measurement. Since no label is required in the disclosed subject matter, it is simpler, cheaper, and avoids the deleterious effect of a label on the biological activity of a molecule. The disclosed approach allows for an automated, robust emulsion analysis system that can be used at a small scale for portable "in the field" sample analysis or used as a microfluidic pilot plant to tailor the chemistry and reaction prior to the expense of scaling up to the bulk process. Because of the disclosed microfluidic architecture, reaction parameters can be varied and the reaction measured and observed so that optimization can occur faster and cheaper than traditional approaches. Given the ubiquity of chemical extractions in industry, this is very valuable.

In another aspect, a method is disclosed to generate microdroplets reliably, accurately, and precisely without a user's intervention; this can be used anywhere where emulsions are employed (industrial production, biomedical and biotechnology, nanomaterials fabrication, pharmaceuticals, research, etc.).

In yet another aspect, a pathway is disclosed for multiplexed drug target discovery of single cells in their microenvironments that is readily scalable from hundreds to tens of thousands or more microreactors. This is, for example, applicable to the study of heterogeneity of tumor cells and the immune system cells in tumor microenvironment. The disclosed technology may be used in downstream analysis and/or the culture of responsive assay elements on the same fluidic platform, without the need for human interaction. The disclosed method allows for the controlled assessment of statistically-relevant populations of cellular host/target interactions and therapies. The system may be used for observing cellular evolution or morphology changes under induced pressures, whether they be environmental, therapeutic, or pathogenic. Using a loaded array, statistical significance of the platform will provide a ready study of lethal dose levels and scales for individual target types.

Single-cell analysis has numerous advantages: (i) biological systems are intrinsically heterogeneous, thus being able to accurately characterize cellular homeostasis is only possible if single cells are analyzed, (ii) single-cell analysis can provide insights into disease mechanisms which are difficult to obtain from bulk cell populations, (iii) in the context of disease intervention, such as tumor cell populations, studying single cells can help disambiguate potentially targetable tumor subpopulations, (iv) studying single cells provides a unique opportunity to map the dynamic regulatory landscape of cells in heterogeneous populations, (v) single cell technologies lend themselves to high-resolution imaging and control of subcellular mechanistic processes, and (vi) single cell immunophenotyping of clinical specimens can significantly advance biomarker discovery for diagnosis, prognosis, assessment of treatment efficacy and patient stratification strategies. Additionally, droplet or single-cell analysis enables analysis of enzymes, including cell-expressed enzymes with applications in a directed evolution context in laboratory settings.

As noted earlier, the disclosed subject matter has numerous applications including: (i) detection of the results of solvent extraction processes (time-dependent quantification of metal ion concentration in the aqueous and organic phases), (ii) environmental monitoring of wastewater for toxic metal, (iii) monitoring of biological cell viability and proliferation, (iv) monitoring of extraction processes used in heavy metal mining, (v) monitoring of extraction processes used in nuclear fuel processing and reprocessing, (vi) monitoring kinetics of enzyme processes, (vii) assessing pharmacodynamics and drug efficacy, and (viii) study of tumor cell as well as stromal cell heterogeneity in a tumor sample.

Example Electrical Measurements of Droplets

To measure the internal or external contents of a droplet using electrical impedance, appropriate frequency (or frequencies) are selected. A droplet in a microchannel can be modeled using an equivalent circuit.

FIG. 1 depicts three configurations of equivalent circuits for droplets in a microchannel in accordance with example embodiments. The three circuits in FIG. 1 show example equivalent circuit models of a solution 102, a droplet 104, and a core-shell particle (or double emulsion) 106 (bottom) in a microchannel, respectively. The model components of the circuit include capacitances such as $C_{dl}$=double layer capacitance 110, $C_{st}$=stray capacitance 115, $C_{int}$=interfacial capacitance 130, $R_{lead}$=the resistance of the electrical leads 135, and $R_{droplet}$=the droplet resistance 120 and $C_{droplet}$ the droplet capacitance 125. The circuit model for the core-shell particle at 106 includes $R_{shell}$=the shell resistance 145, $C_{shell}$=the shell capacitance, and $R_{core}$=the resistance 140 of the core droplet. The foregoing properties are related to the droplet's electrical conductivity and permittivity.

Figure 2:
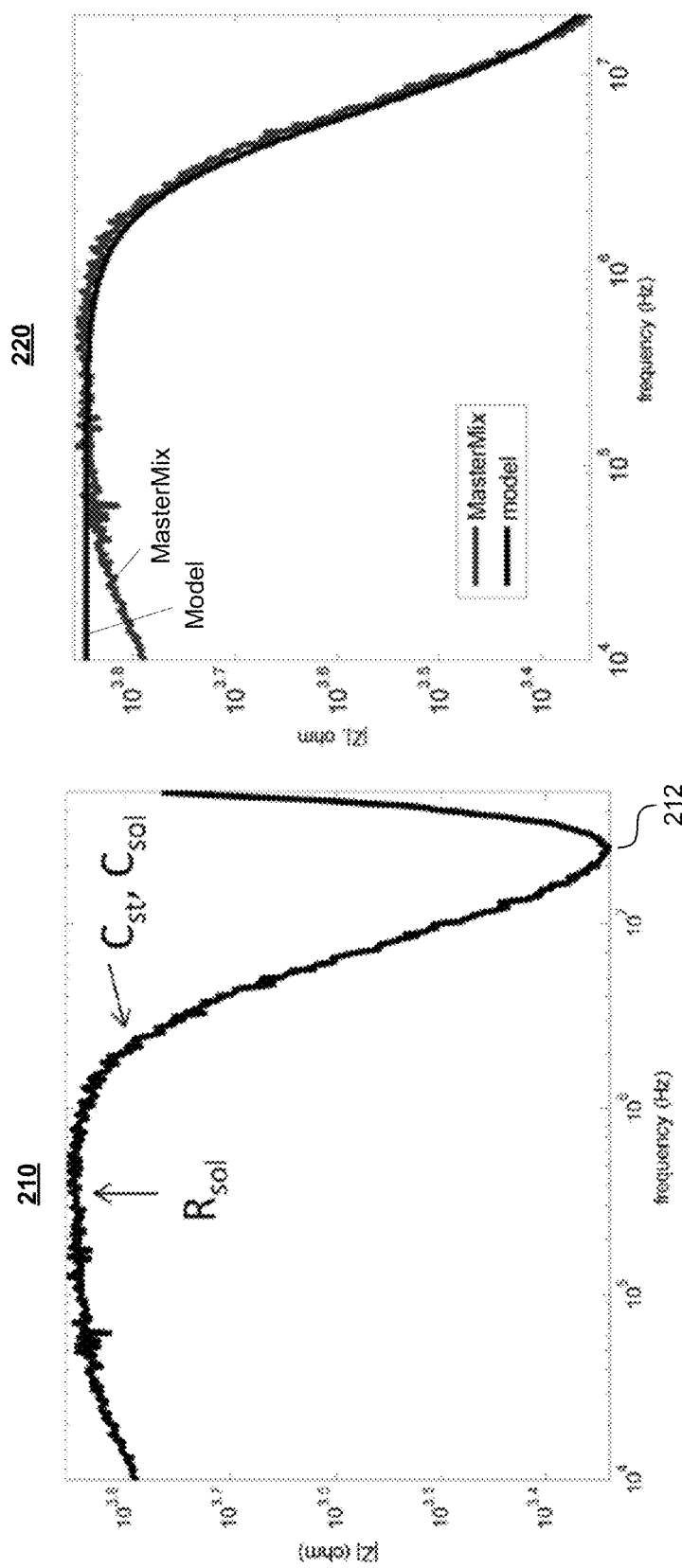
FIG. 2 depicts an example of electrical impedance as a function of frequency for a conductive solution and examples of properties of the system such as the resistance and capacitance of droplet contents.

FIG. 2 at 210 depicts an example of impedance measured in ohms as a function of frequency for a conductive solution in a microchannel, which allows identification of optimal frequency regions for sensing with and external to droplet contents. The roll-off in the impedance plot at the left-hand side of FIG. 2 starts at approximately $10^6$ Hz that is caused by the capacitive effects attributed to the stray and solution capacitances ($C_{st}$ and $C_{sol}$). The roll off continues and a minimum impedance is reached around the frequency region 212. FIG. 2 at 220 depicts properties of the system such as the resistance and capacitance of the droplet contents that can be obtained by fitting an equation for the overall impedance of the system, derived from the equivalent circuit model to measured data of electrical impedance as a function of frequency.

For the system in FIG. 2, the double layer capacitance and the stray capacitance may dominate the impedance at low and high frequency values, respectively. For example, in the example plots of FIG. 2, the impedance value is at a high value and starts to roll off at approximately $10^6$ Hz, reaching a region with minimum values at approximately $10^7$ to $10^8$ Hz, before ramping back up to the high impedance region. To accurately measure properties of the droplet or solution inside a microfluidic channel requires selection of a frequency between these regions, where the impedance values are lower.

The system may drive a droplet at one or more frequencies to collect data about the droplet or system. Examples include:

(1) A first frequency selected to obtain data about the phase surrounding the droplet and a second frequency selected to obtain data about the contents of the droplet;

(2) A first frequency selected to obtain data about the inner contents of the droplet and a second frequency selected to obtain data about the droplet-outer phase interface;

(3) For systems of double- or higher-order emulsions: A first frequency selected to obtain data about the contents of the innermost compartment, a second frequency selected to obtain data about the contents of a shell around the innermost compartment, and a third frequency selected to obtain data about the solution external to the droplet. For the case of a core-shell or W/O/W (water/oil/water) capsule or droplet, the first frequency can be selected to obtain information about the core water component of the capsule, while the second frequency can be selected to obtain information about the oil or lipophilic shell component of the capsule. In such a system, the electrical impedance measurements can provide information about the thickness of the shell or information about the transport of materials into or out of the capsule; and (4) A first frequency selected to obtain information about a droplet (such as the droplet's size), and a second frequency selected to obtain information about the contents of the droplet, such as biological cells. Additional frequencies can be used to obtain information of the interior of said cells.

The impedance may be expressed or measured as a magnitude and a phase or as a complex impedance with a real and an imaginary component.

Figure 3:
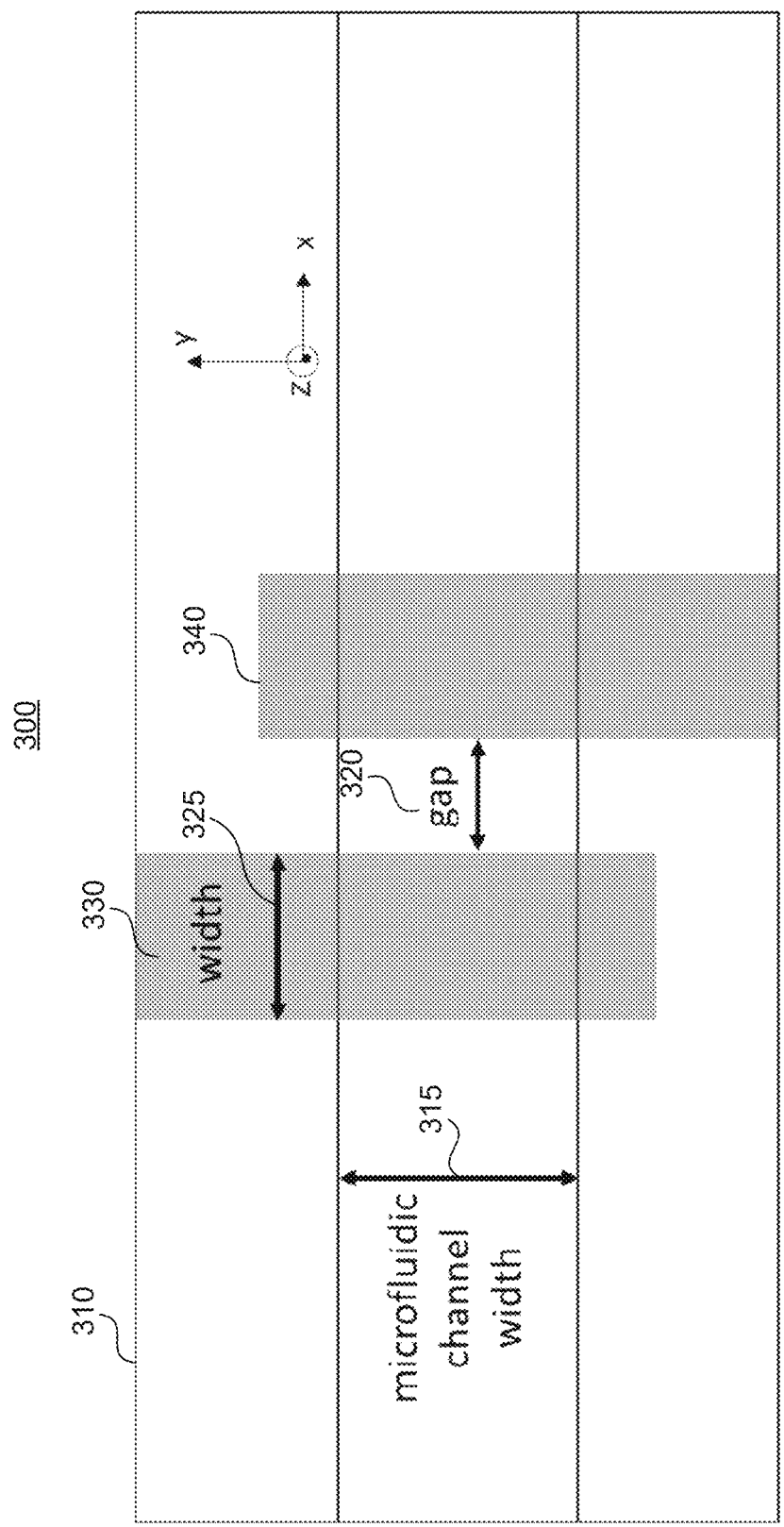
FIG. 3 depicts a top-down view of an example of a two-electrode sensor in a coplanar configuration.

The electrical sensing system includes sets of 2 to 3 electrodes per sensing site. Each set of 2 to 3 electrodes provides one measurement point, and multiple electrode sets may be placed in a single microfluidic device to provide measurement points in different areas of a microfluidic device, which for example provides time-dependent information about a reaction's progress. FIG. 3 at 300 depicts a top-down view of an example of a two-electrode sensor in a coplanar configuration. The electrodes are positioned in microfluidic channel (the center section of the configuration in FIG. 3) so as to make contact with a droplet in the channel. A droplet can flow in microfluidic channel 315 (e.g., from left to right) making contact with one or both electrodes 330 and 340. As the droplet flows in the channel, it makes contact with a first electrode 330, then as the droplet flows further the droplet makes contact with both the first electrode 330 and a second electrode 340, and when the droplet flows further still, contact with the first electrode 330 is lost and the droplet is only in contact with the second electrode 340. Electrodes 330 and 340 comprise a conductive material and have a width 325. The electrodes are spaced apart by gap 320. The electrode width 325 and the gap 320 between adjacent electrodes are chosen based on the size of the droplets and can be scaled to accommodate a wide range of droplet sizes. The gap between adjacent electrodes 320 may be smaller than the droplet size which may increase the sensitivity of the sensor. Electrode width 325 may be chosen to be approximately the same as, or greater than, the gap between adjacent electrodes. Representative values for electrode widths range from 10 nm-100 μm, and corresponding typical electrode gaps range from 10 nm-100 μm as well. It should be further noted that in some examples, the measurement of impedance values can be conducted while the droplet is in close proximity to the electrodes without making actual physical contact. In this case for example, an immiscible carrier medium with low electrical resistivity (e.g., ionic liquid) may be used to ensure negligible resistive drop between the sense electrodes and the free-floating droplets (in contrast to mineral oil whose high resistivity requires the droplets to be in physical contact with the electrodes to ensure successful electrical droplet interrogation). A change in a capacitance value, for example, can be sensed as a droplet passes across the electrodes, thereby causing a change in the sensed impedance value.

Microelectrodes such as electrodes 330 and 340 can comprise different conductive materials, using a variety of techniques for their construction. The type of material selected for the electrode may depend on the particular sensing application For example, gold is etched by nitric acid, so for a system where the droplet contents will include nitric acid, a material that is more resistant to nitric acid attack, such as titanium, may be selected. Example materials for electrode construction include metals such as gold, platinum, chrome, titanium, palladium, or indium tin oxide, which can be patterned using photolithographic procedures such as lift-off, wet metal etching, and sputtering. Electrodes may be constructed from any conductive material (e.g., boron diamond, graphene, etc.).

Figure 4:
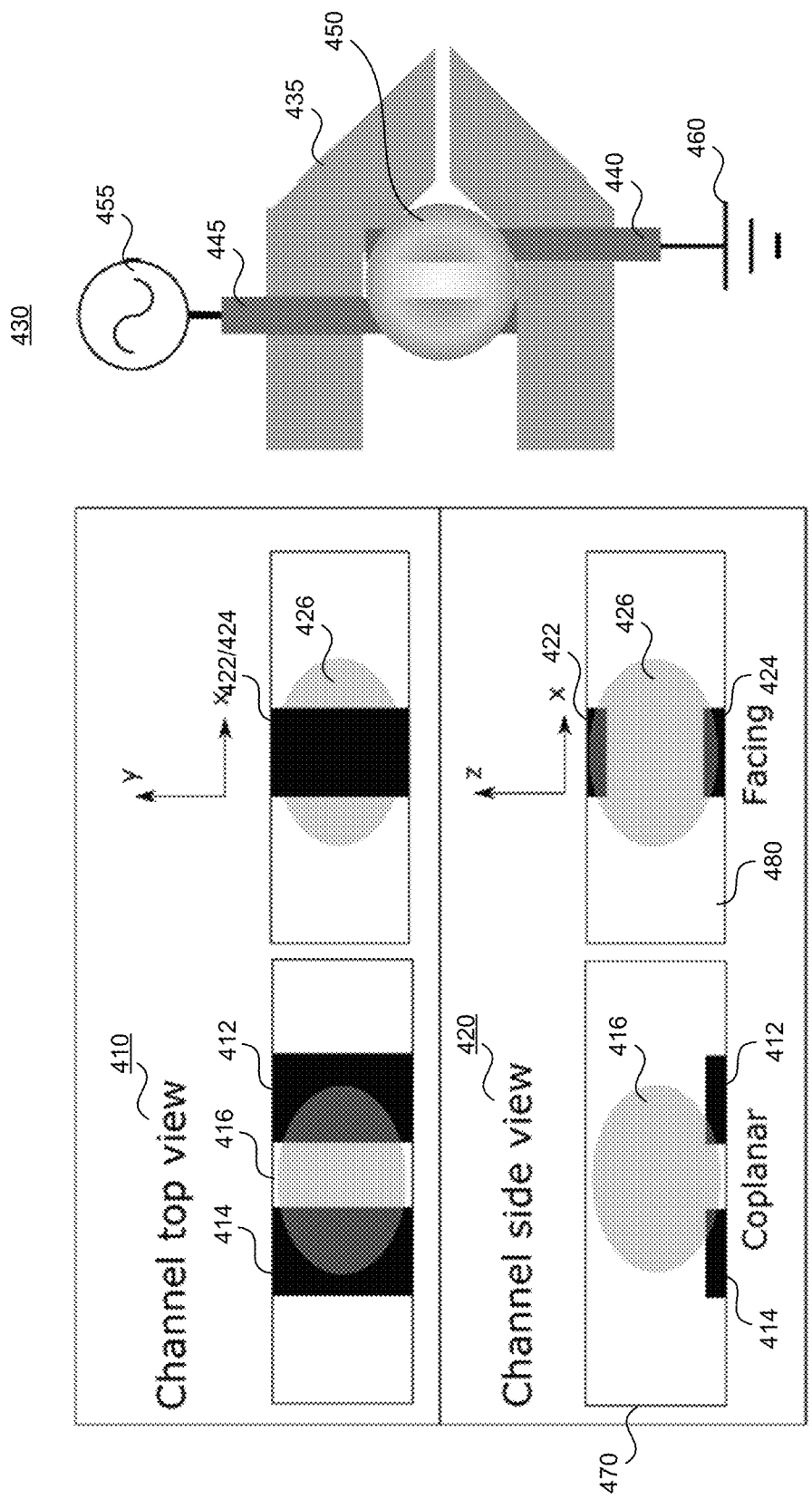
FIG. 4 depicts examples of electrode configurations including a coplanar configuration and a facing configuration.

Electrodes may be positioned in various configurations such as a coplanar configuration 470 or facing configuration 480, as shown in FIG. 4. In the coplanar configuration (left hand side of FIG. 4), two electrodes are positioned side-by-side on an upper or lower layer. In the facing configuration (right hand side of FIG. 4), one electrode is positioned on an upper layer and the other electrode on the lower layer. In the facing configuration, electrodes may be placed either at the top and bottom of a microfluidic channel, or along either side of a microfluidic channel. Shown at 430 is a top view diagram of a droplet 450 trapped in a microfluidic channel structure 435 over a set of coplanar electrodes 440 and 445. The depicted microfluidic channel structure 435 includes a first end that allows the droplet to enter the structure, and a second tapered end that allows the droplet to be trapped.

In the coplanar configuration, electrodes can be patterned from thin (typically <1 μm thick) metal films using photolithographic processes such as lift-off or wet etching of the metal. Coplanar electrodes may be placed in various orientations. For example, a pair of electrodes may be positioned parallel or perpendicular to the primary direction of flow, or may be positioned at an arbitrary angle with respect to the primary direction of flow. For the facing electrode configuration, electrodes may be patterned on the top and bottom of a microfluidic channel using a thin-film of metal and a process such as lift-off or wet etching, or may be patterned along the sides of channel using methods including 3D printing or electroplating. In some example embodiments, a structure within the microfluidic channel such as a droplet trap 435 may be comprised of a conductive material, rendering these structures usable as electrodes. The term "trap" here refers to a structure to arrest the movement of a droplet in a microchannel via a structure that counterbalances the hydrostatic pressure driving droplet movement with capillary, or Laplace, pressure on the droplet. However, the sensing and actuation methods discussed here are not limited to traps that are physical in nature. Such droplet traps may arrest droplets by other means, such as optical (e.g., optical tweezers) or electrical (e.g., dielectrophoresis).

System Diagram and Measurement Configuration

Figure 5:
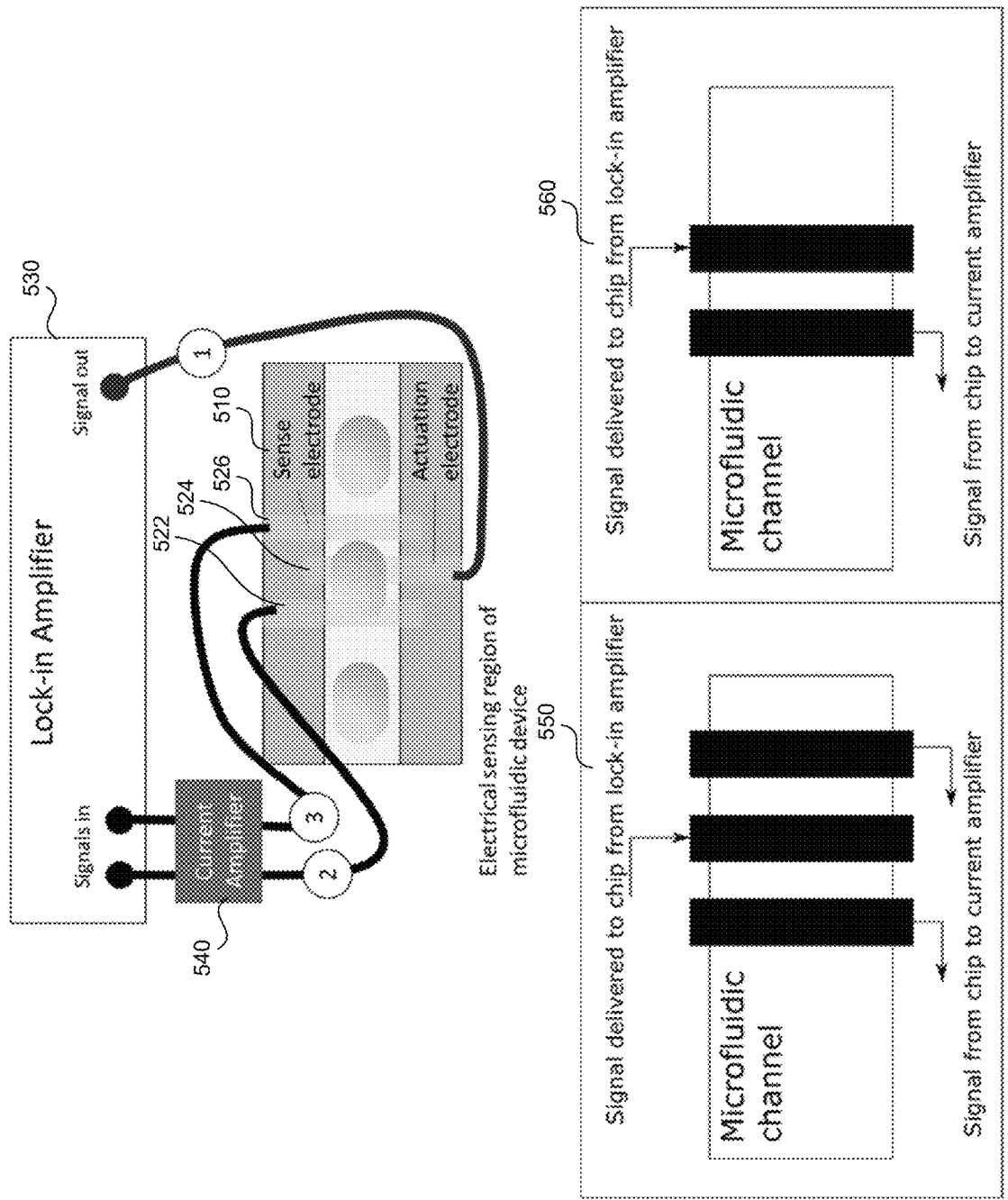
FIG. 5 depicts an example of a measurement system.

FIG. 5 depicts a measurement system, in accordance with some example embodiments. The example measurement system includes a microfluidic device 510 containing integrated electrodes such as electrodes 522, 524, and 526, an impedance analyzer 530 (e.g., Zurich Instruments HF2LI lock-in amplifier), and an amplifier such as current amplifier 540 (e.g., Zurich Instruments HF2TA current amplifier). An output signal of one or more frequencies from the impedance analyzer 530 or a function generator (not shown in FIG. 5) is delivered to one of the electrodes in each of the electrode sets. In a measurement set including 3 electrodes as shown at 550, this signal can be delivered to the middle electrode; in a measurement set including 2 electrodes as shown at 560, this signal can be delivered to either electrode. The other electrode(s) sense the signal that is then amplified by the current amplifier 540 before it reaches the impedance analyzer 530 (lock-in amplifier in FIG. 5).

In the system of FIG. 5, an output signal (label 1) including one or more frequencies is delivered to the actuation electrode(s) on the microfluidic device 510. A signal from the droplets in the microfluidic channel is sensed using one or more electrodes and input to the current amplifier 540, and then to the lock-in amplifier 530. Labels 2 and 3 indicate separate inputs to the current amplifier and lock-in amplifier from different electrodes. If only one electrode is used for sensing, just one of these channels may be used. External, custom Wheatstone or Maxwell bridge circuits can be used to enhance impedance measurement precision or to find the absolute impedance values of droplets or the baseline signal (i.e., when no droplet is present within the sense region). It should be noted that the use of a lock-in amplifier in this example embodiment is intended to facilitate the recovery of the sensed signal based on the known carrier frequency at low signal-to-noise ratio values. It is, however, understood that other devices, such as different amplifiers and detection circuitry can be used to generate signals at desired frequencies, and detect the signals associated with the droplets.

In the 3-electrode sensing system at 550, the middle electrode is actuated with a signal from the lock-in amplifier. The outer two electrodes are used to sense and carry the detected signal from the microfluidic chip to the current amplifier. In a 2-electrode sensing system shown at 560, either of the two electrodes can serve as the actuated electrode, and sensing is done from the remaining electrode.

Figure 6:
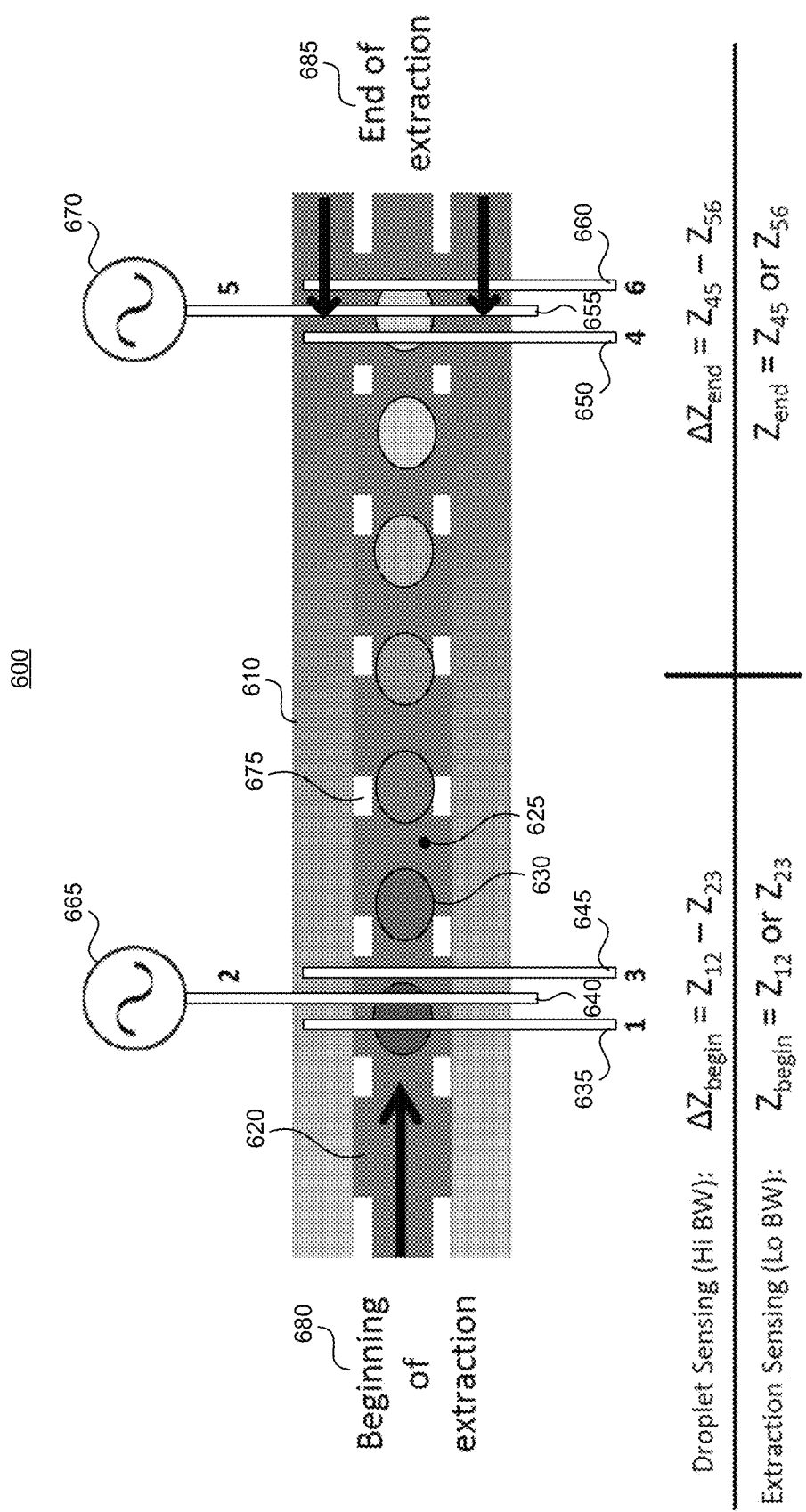
FIG. 6 depicts measuring extraction via impedance in a microfluidic channel, in accordance with some example embodiments.

FIG. 6 at 600 depicts measuring extraction via impedance in a microfluidic channel, in accordance with an example embodiment. Microfluidic tube 610 has a hollow center 620 in which a liquid 625 flows. The liquid includes particles or droplets 630 (referred to hereinafter as "droplets"). For example, droplets 630 may be aqueous droplets that include iron and the liquid 625 may be kerosene. As the droplet 630 flows from the beginning of the extraction 680 to the end of the extraction 685, the iron may be caused to migrate to the exterior of the droplet 630. At the beginning of the extraction 680, droplet 630 passes electrodes 635, 640 and 645; first contacting electrode 635, then contacting electrodes 635 and 640, and last in contact with just electrode 645, as detailed above. Signal 665 with a predetermined frequency is provided to electrode 640 (label 2) and impedances are measured between electrodes 635 (label 1) and 640 (label 2) which is referred to as impedance $Z_{12}$, and between electrodes 640 (label 2) and 645 (label 3) which is referred to as impedance $Z_{23}$. A measure of how much the impedance changes, and thus extraction changes to droplet 630, as the droplet moves from being in contact with 635 and 640 to being in contact with 640 and 645 may be expressed as $\Delta Z_{begin=Z_{12}-Z_{23}}$. Another measure is the impedance $Z_{12}$ or $Z_{23}$. Similarly, signal 670 with a predetermined frequency is provided to electrode 655 (label 5) and impedances are measured between electrodes 650 (label 4) and 655 (label 5) which is referred to as impedance $Z_{45}$, and between electrodes 655 (label 5) and 660 (label 6) which is referred to as impedance $Z_{56}$. A measure of how much the impedance changes, and thus changes to droplet 630, as the droplet moves from being in contact with 650 and 655 to being in contact with 655 and 660 may be expressed as $\Delta Z_{end=Z_{45}-Z_{56}}$.

Another measure is the impedance $Z_{45}$ or $Z_{56}$. Another measure of the extraction is the change in impedance from electrodes 635 and 640 or 640 and 645 to electrodes 650 and 655 or 655 and 660. Compared with configurations that use two electrodes, configurations that use three electrodes can improve the sensitivity and/or reliability of measurements. In some implementations, more than three electrodes may be used. Pillars 675 may be periodically or intermittently spaced along the inside of microfluidic tube 610 to facilitate movement/rotation of the particles, and to facilitate the associated measurements. For example, the physical contact between the droplets and the pillars 675 can cause the droplets to spin, creating forces that facilitate movement of ions (e.g., iron) to the outer surface of the droplets and extraction thereof.

Figure 7:
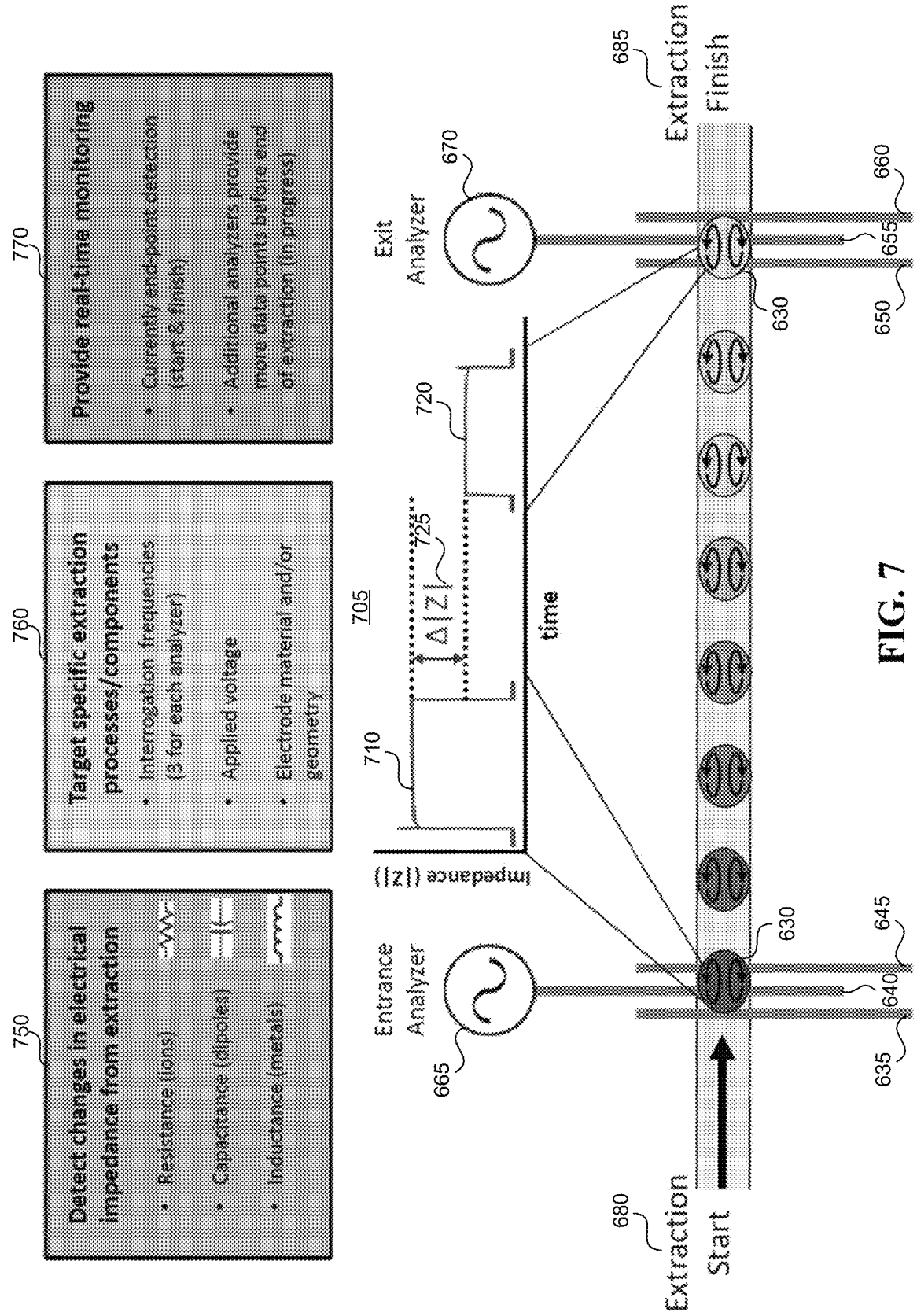
FIG. 7 depicts measuring extraction via impedance in a microfluidic channel, in accordance with some example embodiments.

FIG. 7 depicts measuring extraction via impedance in a microfluidic channel, in accordance with an example embodiment. FIG. 7 depicts the same measurement set-up as FIG. 6. FIG. 7 at 705 depicts an example of a graph of impedance over time. The impedance at 710 is an example of impedance at the extraction start 680. The impedance at 710 may be impedance $Z_{12}$ or $Z_{23}$ in FIG. 6. The impedance at 720 is an example of impedance at the extraction finish 680. The impedance at 720 may be impedance $Z_{45}$ or $Z_{56}$ in FIG. 6. Δ|Z| at 725 is the difference between the impedance at the extraction start 680 and the impedance at the extraction finish 685. Δ|Z| is a measure of the change in impedance due to the droplet 630 as extraction proceeds from the electrodes 635, 640, and 645 at the extraction start 680 to the extraction finish at electrodes 650, 655, and 660. The top section of FIG. 7 illustrates example changes in impedance caused by different factors, examples of how specific extraction processes or components can be targeted, and example monitoring locations or set ups. In particular, at 750, detection of changes in impedance of the droplet from extraction can include resistance changes such as resistance changes due to ions moving within the droplets, capacitance changes such as capacitance changes due to dipoles in the droplet, and inductance changes such as inductance changes due to metals in the droplets. At 760, specific extraction processes may be targeted by selection of interrogation frequencies 665 and 670, an applied voltage across the electrodes, and selection of the electrode material and/or geometry. At 770, real-time monitoring may be provided by electrode sets at the start and finish. Additional electrode sets may be provided along the path from the start to the finish. Note that in FIG. 7, the droplets are in physical contact with the microfluidic channel surfaces, which similar to the configuration of FIG. 6, can facilitate the extraction process via the generation of vortices.

Figure 8:
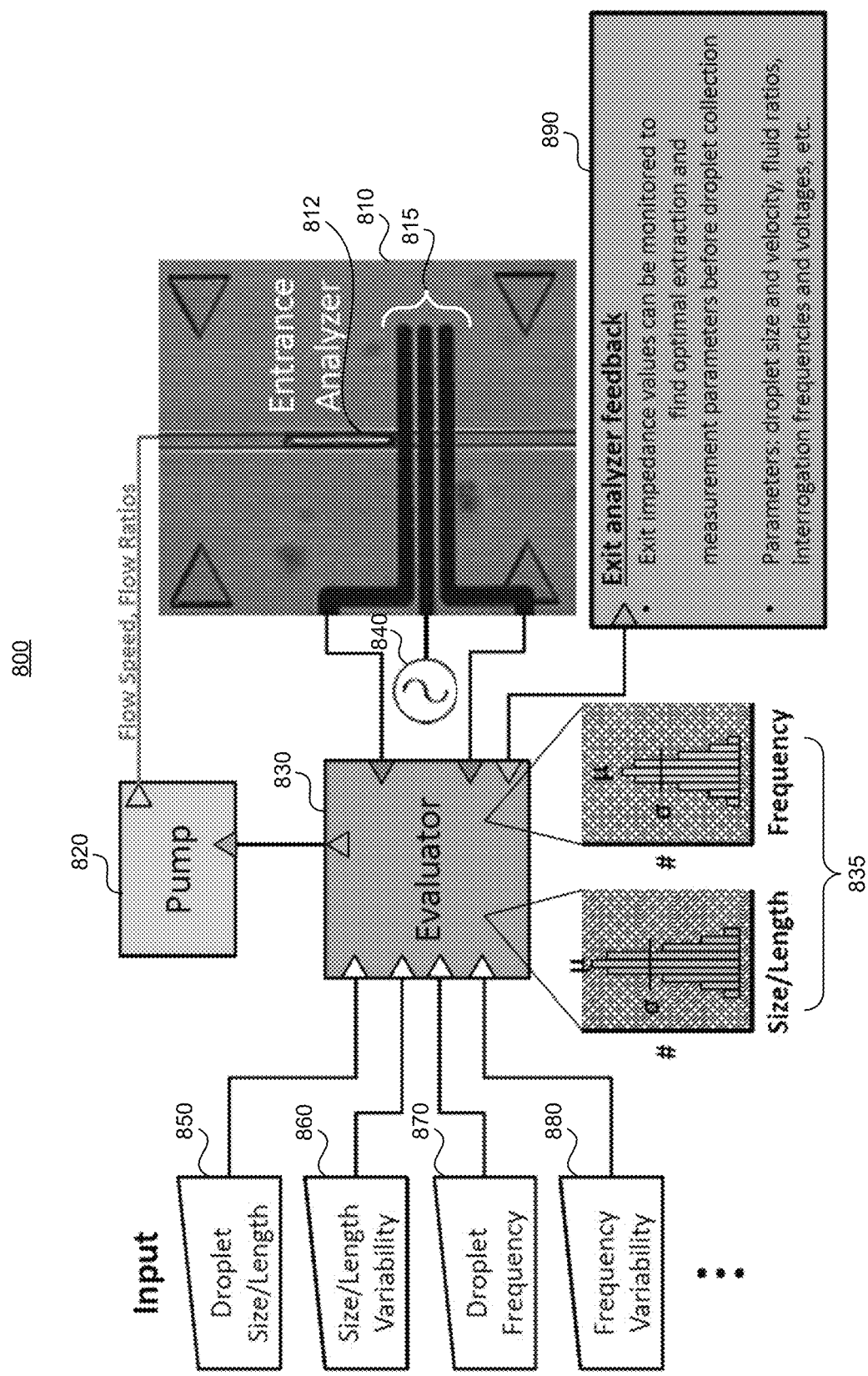
FIG. 8 shows depicts an example of a system using electrical impedance feedback control for droplet generation.

FIG. 8 depicts a system using electrical impedance feedback control for droplet generation in accordance with an example embodiment. An interface allows for determining the characteristics of droplets based on various target criteria values, including target mean and allowed variation from the mean. The evaluator module 830, which may include hardware and/or software components, calculates flow rates for each pump based on a look-up-table and/or pre-defined algorithm and sends the appropriate commands to the pumps 820 to initiate droplet generation. Once droplets are generated, the evaluator receives real-time streaming data from the impedance analyzer and calculates the mean and variation for each droplet criterion. If the mean and/or variation of the droplets are outside of the criteria target values, the evaluator varies the pump flow rates to meet the criteria. This feedback loop of adjusting pump flow rates and receiving the resulting droplet characteristics may be continued until all criteria target values are satisfied. If the criteria are not satisfied after adjustments are made, the system determines that a failure has occurred and reports possible causes (e.g., bad microfluidic chip surface coating, clogged chip, etc.). Executable code consistent with the disclosed subject matter controls all fluidics and electrical impedance measurements and feedback, and provides/records emulsion statistics of the generated droplets (e.g., production rate, mean diameter/volume, monodispersity, etc.).

In some embodiments, an additional set or sets of electrodes and impedance analyzer can be used to evaluate the droplets farther downstream to provide a secondary form of feedback on subsequent processing occurring to the droplets. This feedback can be used to automatically find optimal droplet processing parameters that are related to droplet generation or other components for the manipulation and/or interrogation of the droplets.

FIG. 8 further depicts an example of a droplet impedance analyzer 800, in accordance with some example embodiments. At 810 is an entrance impedance analyzer with electrodes 815 similar to the three electrode examples shown in FIGS. 5-7. Signal source 840 provides a signal at one or more predetermined frequencies. The impedance of droplet 812 passing by electrodes 810 of entrance analyzer 810 is measured by evaluator 830. Evaluator 830 stores impedance values from multiple droplets and may generate histograms 835 of various measurements such as the size or length of droplets based on a flow rate. An exit analyzer 890 similar to entrance analyzer 810 may be included in the analyzer 800. The exit impedance values can be monitored to determine optimal extraction and measurement parameters before droplet collection. Parameters that can be adjusted in the analyzer 800 include droplet size, droplet velocity, fluid ratios, interrogation frequencies, and applied voltages, as well as others. Inputs to the evaluator 830 can include, but are not limited to, droplet size/length 850, droplet size/length variability over multiple droplets 860, the frequency of droplets 870, and a variability in the frequency of droplets 880.

Figure 9:
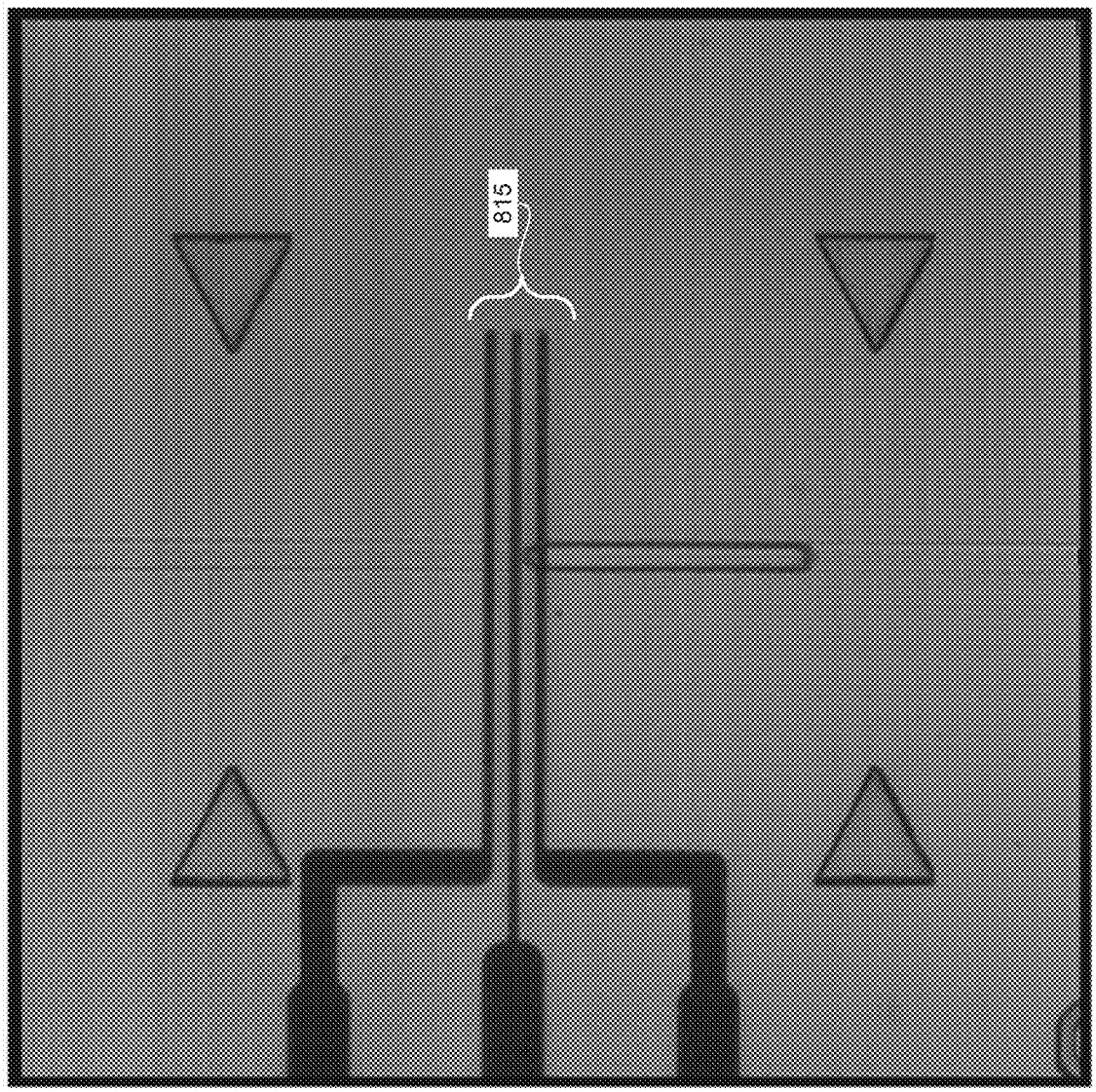
FIG. 9 depicts an example of a picture showing a droplet passing a three-electrode impedance sensor.

FIG. 9 depicts a picture showing a droplet passing a three-electrode impedance sensor, in accordance with some example embodiments. Microdroplet passing through three-electrode sensing region that is narrowed-down to create a slug that will contact the electrode interface. As a droplet flows over the sensing region 815, a peak in the signal is detected (see, e.g., FIG. 10). The peak magnitude is extracted and can be compared to the peak magnitude from droplets generated from many different samples. It may be useful to analyze the real or imaginary components of the impedance signal, or both, depending on the nature of the compounds being detected.

Figure 10:
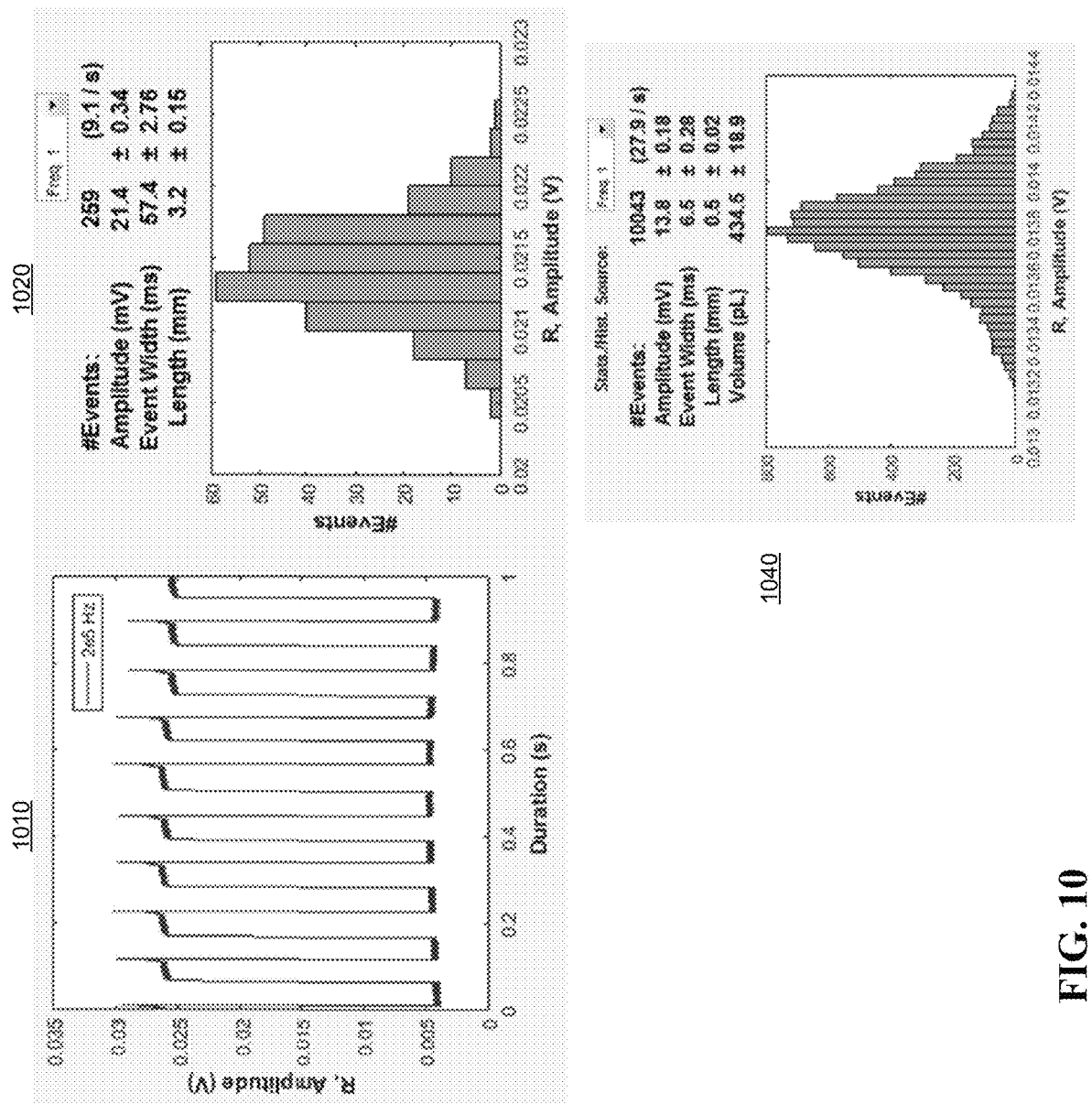
FIG. 10 depicts examples of impedance pulses caused by the passage of droplets through a impedance sense region.

FIG. 10 at 1010 depicts examples of impedance pulses caused by the passage of phosphate-buffered saline (PBS) droplets (in organic continuous phase) through a microfabricated impedance sense region. In this example, the electrodes are driven with a 200 kHz signal. Shown at 1020 are examples of a real-time display of events, statistics, and population distributions.

The statistics shown in FIG. 10 at 1040 were obtained by a high density of impedance pulses caused by the passage of ferric nitrate droplets (in organic continuous phase). Impedance signals were observed at three discrete frequencies (200 kHz, 2 MHz, and 20 MHz). Shown at 1040 is a display of events, statistics, and population distributions for each frequency. As evident from the statistics at 1020 and 1040, the disclosed technology can be readily used to detect impedance changes for droplets having different characteristics, including different lengths, widths, composition and number.

Figure 11:
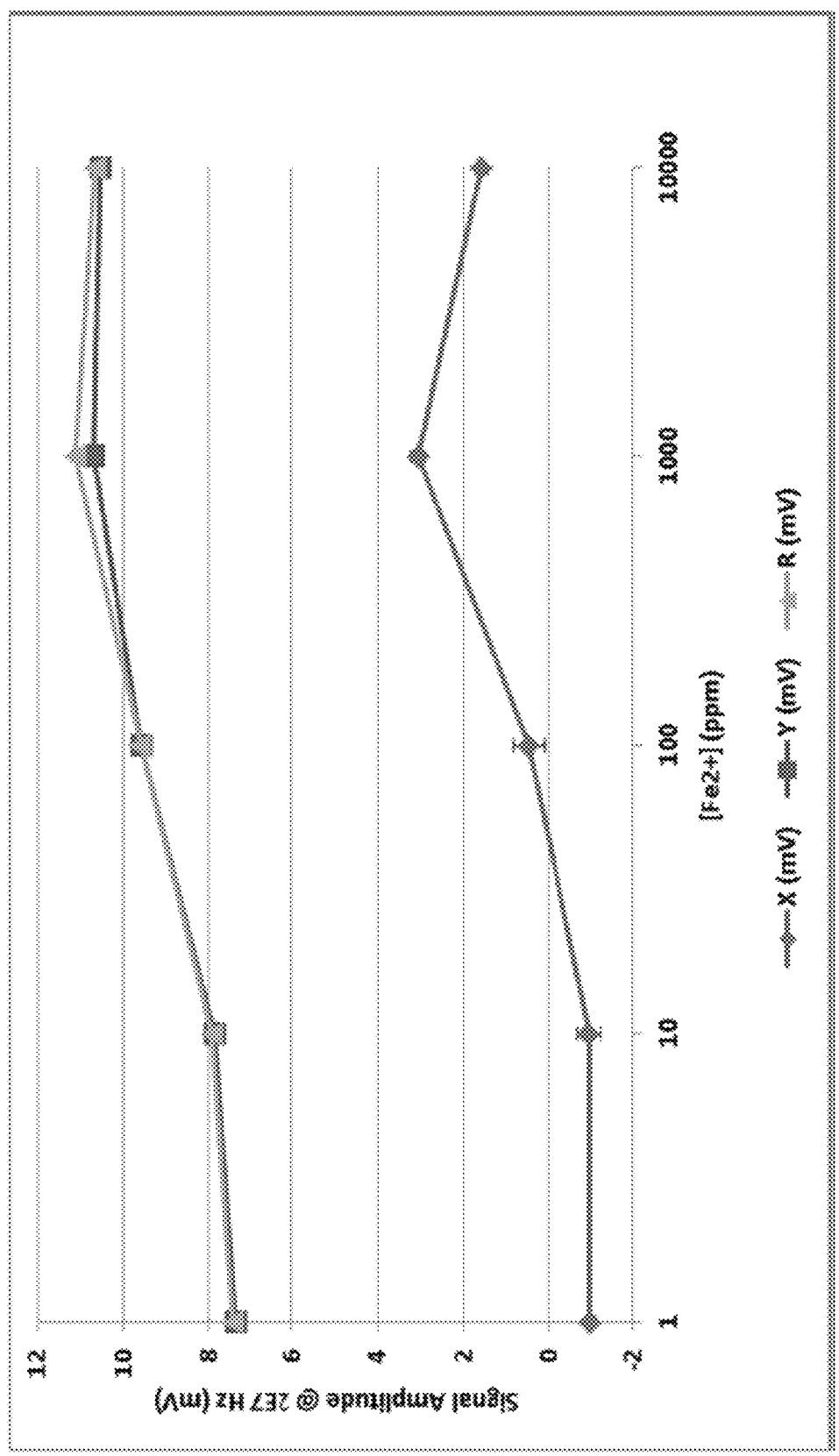
FIG. 11 depicts an example of determining a concentration of iron in nitric acid droplets.

FIG. 11 shows example plots that allow the concentration of iron to be determined electrically in nitric acid droplets (formed in kerosene continuous phase) at an interrogation frequency of 20 MHz. The change in impedance trend at 10,000 ppm may be due to effects of $Fe^{2+}$ saturation, giving the upper limit of detection. Signal values of various impedance components for different $Fe^{2+}$ concentrations in nitric acid droplets are represented by: X (real), Y (imaginary), R (magnitude, $\sqrt{X^2+Y^2}$). In this experiment, the phase angle (θ) did not show a trend and was omitted. Error bars are a single standard deviation from the mean of at least 10,000 impedance pulses (droplets) collected for each data point.

Electrodes for Sensing and/or Actuation of Stationary or Trapped Droplets

A. Tracking Droplet Position

In some embodiments, a separate electrical impedance sensor can be positioned in each trap of an array to detect the occupancy of the trap by a droplet to track the order in which traps are loaded. Droplets comprising different contents can be trapped in the array and their identity preserved using this approach.

Figure 12:
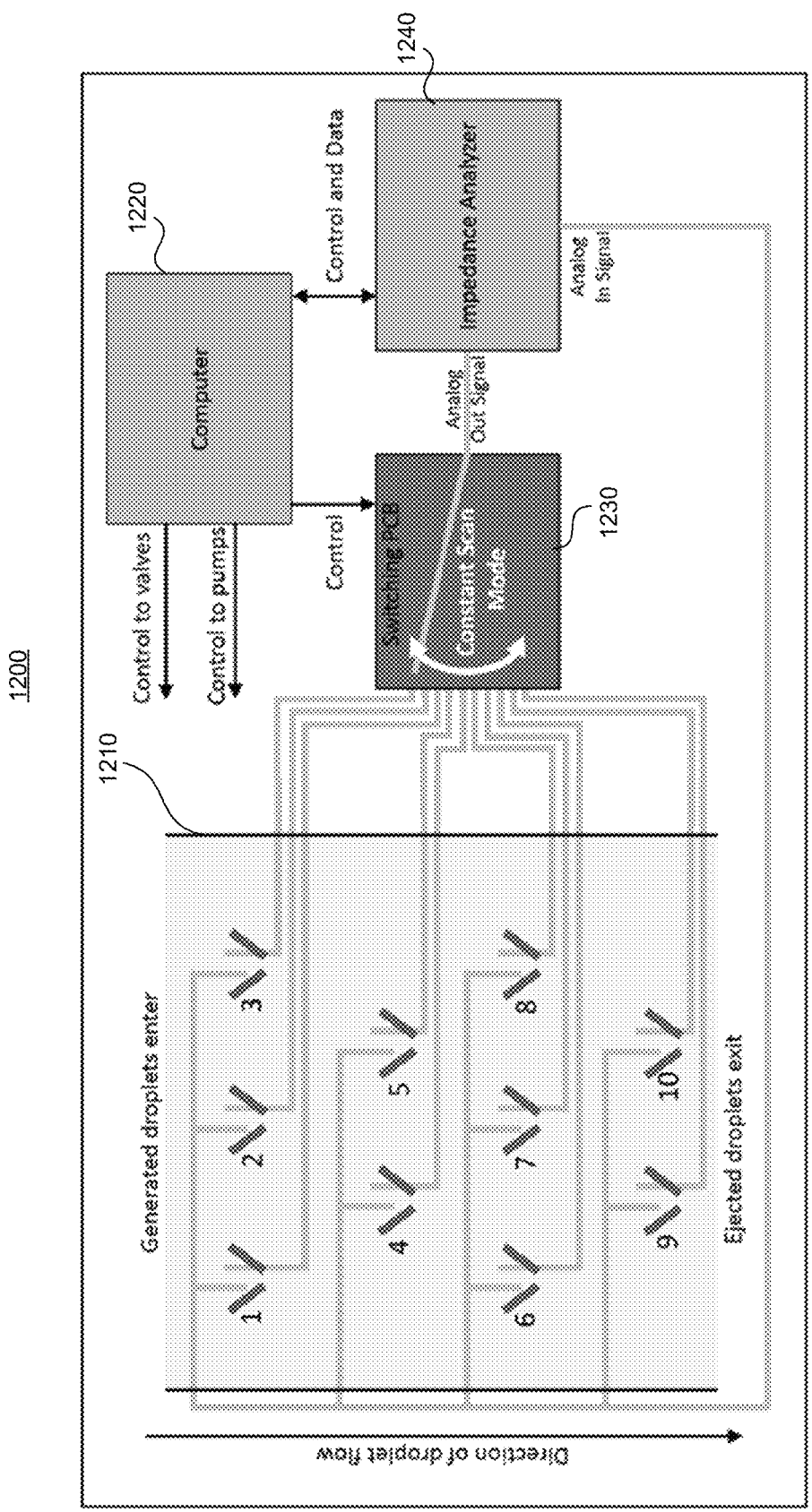
FIG. 12 depicts an example embodiment of a droplet tracking system.

FIG. 12 shows an example embodiment 1200 of a droplet tracking system. A microfluidic chip 1210 comprising a chamber of droplet traps is overlaid onto a network of microscale electrodes, with one set of electrodes per trap. A computer 1220 controls the fluidic actuation via valves and pumps. The computer 1220 communicates with a switching board 1230 that electrically connects the impedance analyzer to each trap for a certain duration. This provides the ability to scan large numbers of traps with a single impedance analyzer 1240 at rates much faster than 1 trap per second. As the traps fill with droplets, the occupancy of a particular trap by a droplet is detected by a change in impedance from the corresponding electrode set under the trap.

Figure 13:
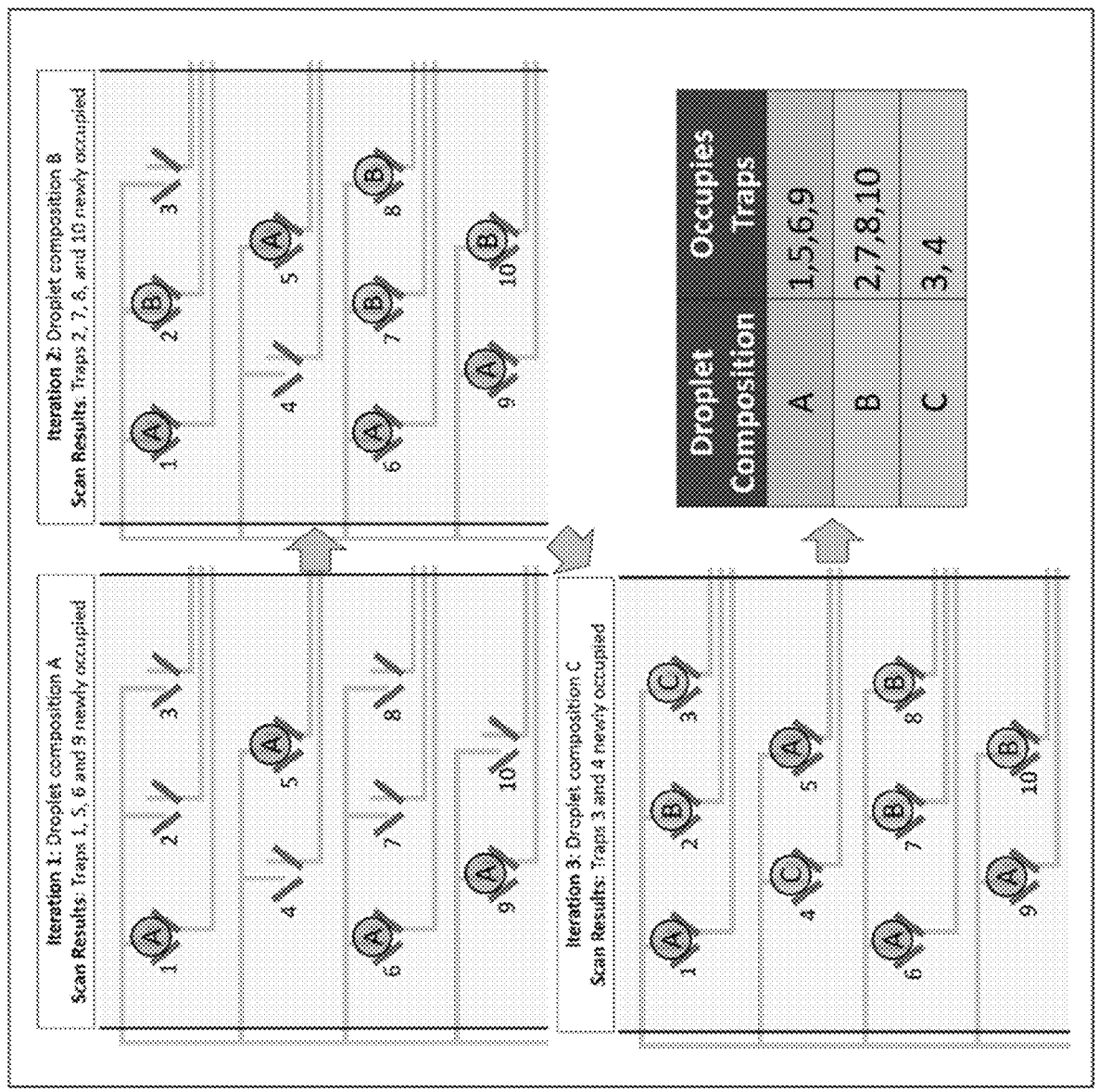
FIG. 13 depicts an example method using impedance sensing to track the position of droplets in a static array.

Below is an example method using impedance sensing to track the position of droplets in a static array. See FIG. 13.

1. Single or multiple-emulsion droplets of composition A are created using any of a variety of methods known in the art.

2. Once droplet creation is stable and with correct size, length, impedance, etc., a valve is switched to direct the droplets toward an array of traps instead of into waste.

3. A custom PCB switching board continually scans the impedance values of each trap which is addressed using an independent set of electrodes for each trap. When a droplet docks at a trap, the trap's impedance value changes. The program controlling the pumps, valves, impedance analyzer, and switching board detects this change and notes the trap's position and that it is filled with a droplet of composition A.

4. Once a sufficient number of droplets of composition A are created, the valve is switched to release the droplets (e.g., direct the droplets back to waste).

5. Droplets of a different composition (composition B) are generated using a combination of different biological, biochemical, or chemical solutions.

6. Same as step 2.

7. Same as step 3, but the program now records the newly-trapped droplets as those of composition B.

8. Same as step 4, but for droplets of composition B.

Steps 4 through 8 show how this iterative process of steps 1 through 4 can repeat N times to create N compositions of droplets. This process can stop at the user's request, when the program detects that all traps are filled or when all droplet compositions of interest have been created and trapped.

After droplet trapping and tracking, long-term impedance evaluations of each droplet composition are performed simultaneously or nearly simultaneously in similar conditions, creating a controlled experiment platform for detecting changes in chemical, biological, or biochemical reactions. A custom program can be used to dynamically find the most sensitive interrogation frequency to impedance changes caused by a particular assay. The program can sequentially scan each droplet's impedance and/or phase angle over a range of frequencies and can determine the frequency that provides the largest change of a particular component of impedance (i.e., X, Y, R, phase angle, or a combination thereof) over time. This "auto-tuning" can provide the most detection sensitivity for various assay conditions with the least user interaction, which is amenable to large-scale, heterogenous assays.

A method similar to the one used to track the capture of the droplets may be used to ensure droplets are ejected out of traps (droplet actuation may be performed through various means). If a droplet shows all the criteria for ejection for downstream analysis, the program/user, knowing its position in the trap array, can initiate the ejection procedure (e.g., mechanical, electrical, optical, etc.). Ejection should happen at a slow enough rate to ensure that each ejected droplet is accounted for in downstream analysis or manipulation. Ejected droplets may be subsequently directed through a subsequent network of trapped arrays and valves, providing a highly-specialized, dynamic testing platform that can precisely interrogate droplet populations based on upstream results.

Figure 14:
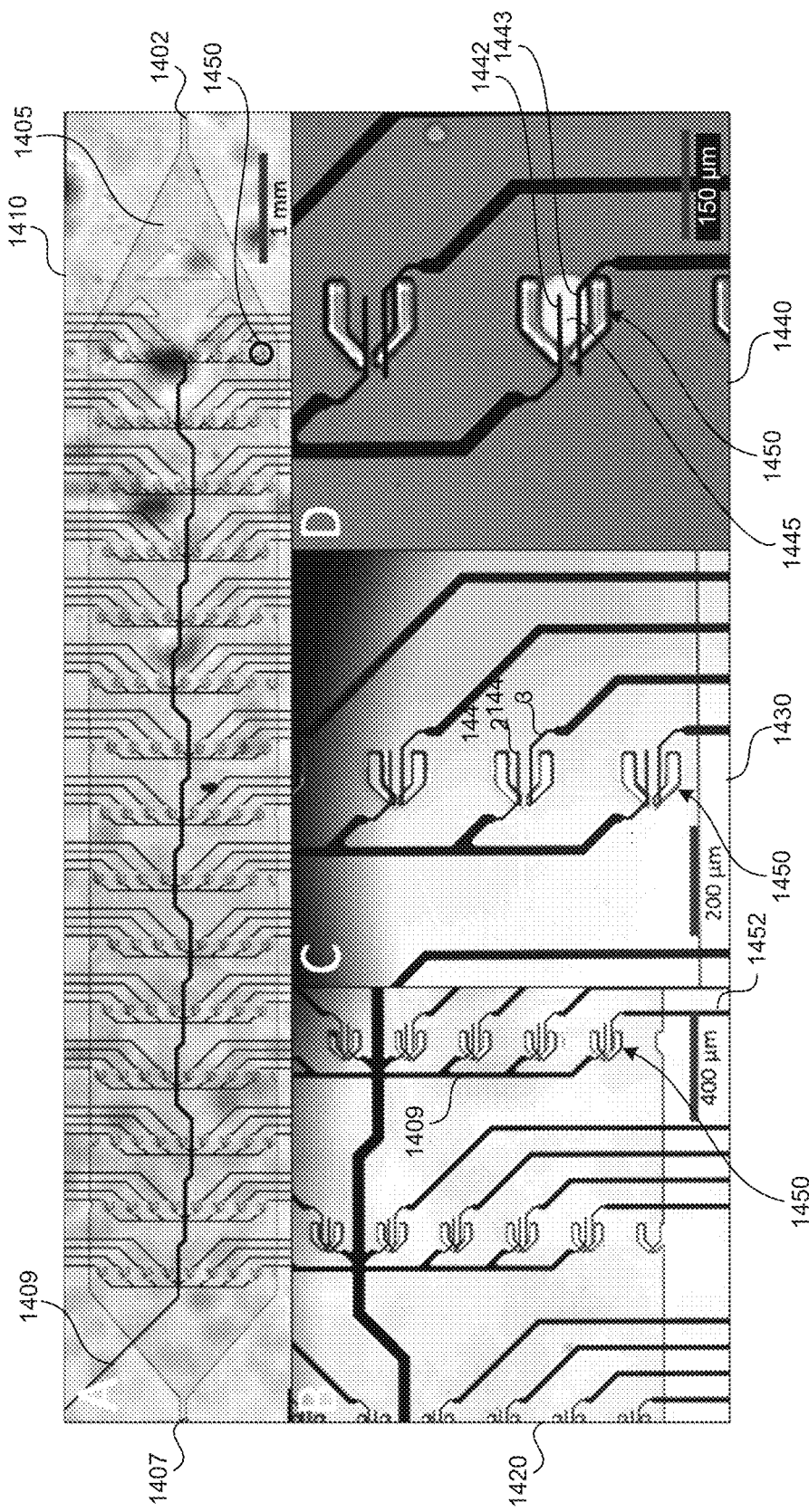
FIG. 14 depicts examples of pictures of a microfluidic structure at different optical zoom levels in each picture.

FIG. 14 illustrates an example of a fabricated device which includes a chamber with 120 traps and electrical impedance sensing for the 120 traps that are individually addressable.

Sections identified as A, B, C and D at 1410, 1420, 1430, and 1440 are at successive magnifications to show trap layout and geometry. At 1440 (D) a ~75 picoliter fluorescein droplet captured in an impedance trap is depicted; the captured droplet is centered over a pair of coplanar electrodes that detect the presence of the droplet. The substrate of this device is comprised of glass and micropatterned platinum electrodes. The on-chip fluidics are created via polydimethylsiloxane (PDMS) that can be formed by, for example, curing over a microfabricated mold using a photoresist such as SU-8. The device can track droplet location, and be used to perform long-term studies on the changes of droplets (and their contents) via electrical impedance spectroscopy. The platinum sensing electrodes of this geometry or another can also be used to actuate the droplets to release them from their respective traps. Electrical contact to instrumentation in this device may be made through POGO (spring loaded contact pins), but other technologies can be used, including edge card, wire bonding, flip chip, and ball grid array, and others. Flip chip and ball grid array allow a higher density of traps per device area since the electrical contacts is underneath the fluidics, requiring little additional device area, if any.

At 1410 (A), an array of droplet traps is shown in a microfluidic channel 1405 (1 millimeter scale). A fluid including droplets flows from fluid input 1402, through microfluidic channel 1405, to fluid output 1407. Each trap includes two electrodes. One electrode from each trap is connected to a common conductor 1409 (see section B). The second conductor from each trap is an independent contact that is connected to a demultiplexer (see, FIG. 15). An example trap is shown at 1450. Fifteen columns of traps are shown with each column having eight traps. Other number of columns and other numbers of traps per column can be implemented within the scope of the disclosed technology.

At 1420 (B), a zoomed-in section with a 400-micrometer scale shows the lower right portion of the section 1410. More details can be seen of the traps, such as the trap 1450, the connections to the common conductor 1409, and the independent conductors such as conductor 1452 associated with the trap 1450.

At 1430 (C), a zoomed-in section with a 200-micrometer scale shows the lower right portion of the section 1420 (and 1410). More details can be seen of the traps, such as the trap 1450, including the electrodes 1442 and 1443 associated with the trap 1450. Electrode 1442 connects to common conductor 1409 and the electrode 1443 is the independent conductor fed to a demultiplexer and impedance analyzer.

At 1440 (D), a zoomed-in picture with a 150-micrometer scale shows the lower right portion of the section 1430 (and 1420 and 1410). The details of the traps, such as the trap 1450 can be seen, including the electrodes 1442 and 1443 associated with the trap 1450. Droplet 1445 is trapped in the trap 1450. Electrodes 1442 and 1443 contact the droplet 1445. Through the electrodes 1442 and 1443, common conductor 1409 to an impedance analyzer and independent conductor 1443 through a demultiplexer to the impedance analyzer, the impedance of the droplet 1445 can be measured.

B. Detection of Droplet Contents

In some embodiments, separate electrical impedance sensors for each trap in an array of traps can be used to detect properties of trapped droplets, including pH and conductivity. In addition, when the droplets encapsulate biological cells, the impedance sensors can be used to detect the presence of the cell, cell viability, monitor cell growth, and characterize the cell's membrane properties. Disclosed herein is the use of electrical impedance to detect the presence of cells, nucleic acids, proteins, or solute concentrations in an array of retrievable, trackable, and trapped droplets in a closed fluidic system. The electrical impedance sensors can be used to measure properties of core-shell particles or multiple emulsions, including several layers of immiscible phases. The disclosed subject matter can be used to quantify the thickness of the shell of such particles, or to dynamically monitor a process occurring within or external to a droplet in which a reaction product moves into or out of the particle over time, as well as other features.

C. Actuation of Droplets/Droplet Contents

In addition to using electrodes for detection of droplet or capsule/particle contents, electrodes can be configured to enable actuation of droplet or droplet contents for purposes including:

(1) electroporation of a cell within a droplet to introduce nucleic acids or proteins into the cell;

(2) electrophoresis to purify or selectively remove compounds from trapped droplets; and/or (3) movement of the droplet or release of the droplet from a trapped position;

The ability to release individual droplets via individual electrode traps as disclosed herein is an enabling technology for studies linking the genotype and phenotype of biological cells. The phenotype of a cell may be observed inside of a trapped droplet, and then importantly may be selected and collected for further study by releasing a single droplet from an array of trapped droplets.

Actuation of a droplet with DC or AC electrical fields can be used to introduce material to cells via electroporation. With the technology outlined above with the aid of figures, including FIG. 14, the contents of droplets in an array can be monitored and select cells can be chosen for electroporation/transformation.

Figure 15:
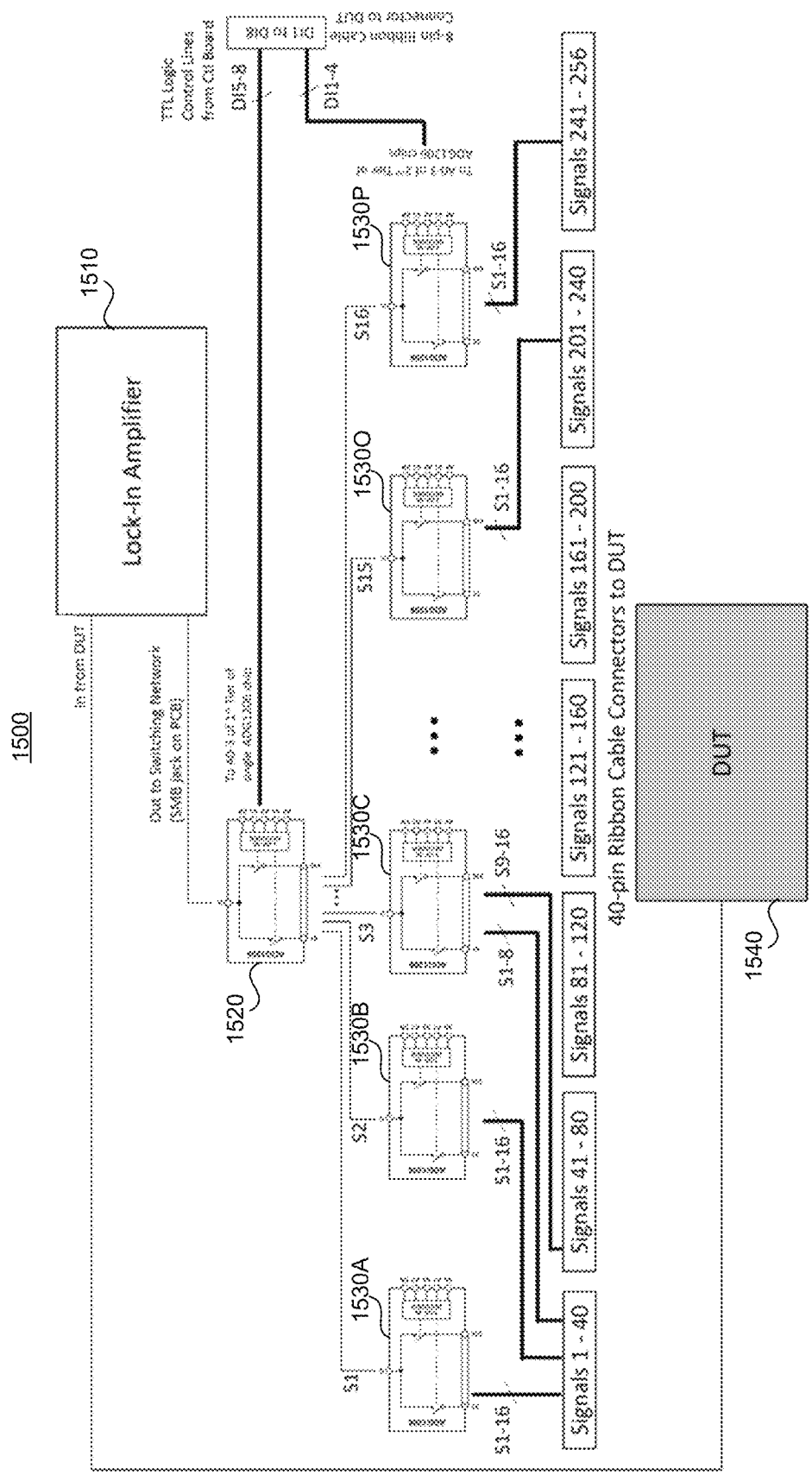
FIG. 15 depicts an example of a demultiplexer for selecting measurement of one of a plurality of traps.

FIG. 15 shows an example of a demultiplexer for selecting measurement of one of a plurality of traps, in accordance with some example embodiments. Illustrated are 16 demultiplexers 1530A to 1530P, each having 16 outputs. The input of each demultiplexer 1530A to 1530P is connected to one of 16 outputs of demultiplexer 1520 having an input that is connected to an output of the lock-in amplifier 1510. The demultiplexer in FIG. 15 includes 256 outputs (Signals 1 to 256) for connection to device under test 1540; such outputs can be used to activate, release, sense or otherwise control an individual trap in the device under test 1540.

DC electrical actuation can be used to induce electrophoresis in droplets trapped in an array. Following cell lysis by any number of methods, select sets of electrodes can be actuated with a DC field to remove nucleic acids from select droplets by electrophoresis. Using this approach, the DNA from a select subset of cells can be isolated from the droplets and analyzed for the expression of a phenotypic characteristic of interest.

Figure 16:
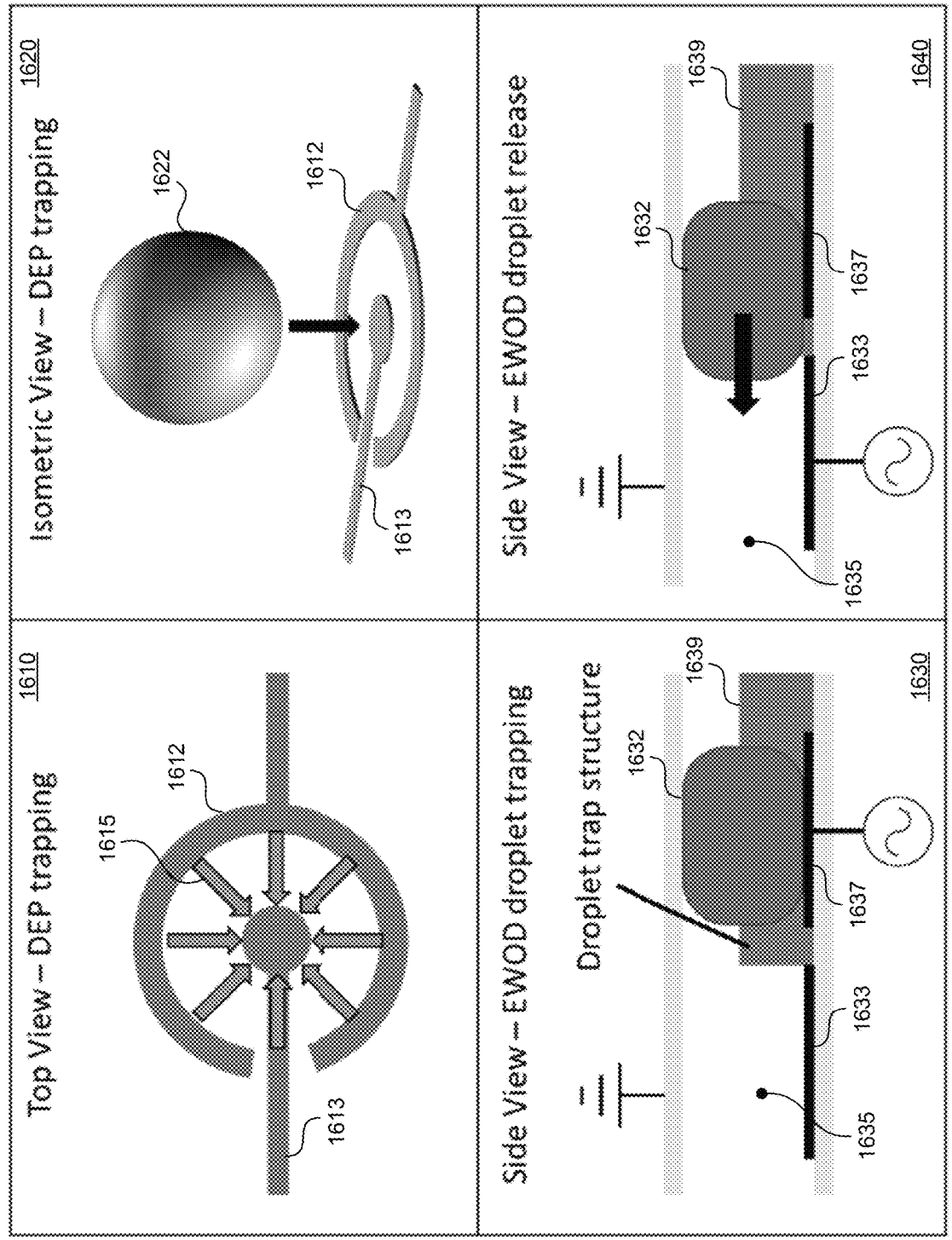
FIG. 16 depicts a diagram showing the release of a droplet using dielectrophoresis and electrowetting-on-dielectric (EWOD), in accordance with some example embodiments.

Example mechanisms by which actuation with microelectrodes can be used to move and remove individual droplets from an array, include dielectrophoresis (DEP) and electrowetting-on-dielectric (EWOD) technology. Examples of the use of these physics to move a droplet from a trapped position are shown in FIG. 16.

Time-averaged DEP force may be expressed by Equation (1) as:

$$\langle F_{DEP} \rangle = 2\pi r^3 \varepsilon_m \, \text{Re(CM)} \nabla |E_{rms}|^2 \qquad \text{Equation (1),}$$

where $\langle F_{DEP} \rangle$ is the time averaged force, $\varepsilon_m$ is the permittivity of the media, $|E_{rms}|$ is the magnitude of the applied electric field, and CM is the Clausius-Mossotti factor, given by:

$$CM = \left( \frac{\varepsilon_p^* - \varepsilon_m^*}{\varepsilon_p^* + 2\varepsilon_m^*} \right), \qquad \text{Equation (2)}$$

where $\varepsilon_m^*$ is the complex conjugate of the permittivity of the media, and $\varepsilon_p^*$ is the complex conjugate of the permittivity of the particle An aqueous droplet in an organic or non-polar medium may (given the dielectric constants of most common organic and non-polar fluids used in microfluidics) experience positive electrophoresis due to the positive value of the Clausius-Mossotti factor and trap at the point of the strongest electrical field gradient, which is at the center of the electrode structure indicated by the arrows 1615 in section 1610 of FIG. 16. To release a droplet trapped, the electrode pair containing the trapped droplet is de-actuated. A modest flow rate of the surrounding phase fluid may transport the droplet away from the trap. Depending on the permittivity values of the droplet and the medium, there may be a frequency range where the droplet experiences negative DEP. In these cases, changing the frequency from one in the positive DEP range to one in the negative DEP range for that particular set of electrodes can result in the release of the trapped droplet. In the presence of flow in the microfluidic channel, the droplet can be carried downstream in the channel and transported to another part of the device, or off of the device for further analysis.

When the complex permittivity of the media ($\varepsilon_m$) is greater than the complex permittivity of the particle ($\varepsilon_p$), for example, when working with a water/oil/water, or W/O/W capsule, the particle can experience negative DEP. In these cases, DEP can be used to eject a droplet from a trap when the droplet has been passively trapped (e.g., by capillary pressure in a microfluidic channel or array).

FIG. 16 also depicts diagrams illustrating electrowetting-on-dielectric (EWOD), which along with DEP, are two example mechanisms that can be used to remove a droplet from a trap in a microfluidic channel. At 1610 and 1620 electrodes 1612 and 1613 can be used to trap a droplet 1622 in one position using dielectrophoresis. Once trapped, the droplet 1622 can be released by de-actuating the electrodes 1612 and/or 1613, and the flow of the continuous phase around the droplet 1622 will transport it away from the trap. At 1630, a droplet 1632 is trapped. At 1640 the droplet 1632 is released from the trap using the EWOD. EWOD can be used for droplet manipulation in the disclosed system where droplets are transported by pressure-driven flow. In some example embodiments, pressure driven flow may be used to position droplets in traps, and EWOD actuation may be used to remove a selected droplet from its trap. This is illustrated at 1630 and 1640 in FIG. 16. In this configuration, the bottom of a microfluidic channel 1635 is patterned with an array of electrodes 1633 and 1637, while the top plate 1639 of the microfluidic channel is an electrically conductive substrate. Actuation of an electrode adjacent to a droplet causes the droplet to move to the energized electrode. Using this scheme, a selected droplet can be moved out of a trap and carried out of the microfluidic device by pressure-driven flow.

DEP or other electrical-based forces can be combined with other methods to ensure droplets are ejected from traps. Another example method is creating cavitation bubbles underneath (or over if the bubbles are positively buoyant and resting on the ceiling of the chamber) droplets via focused laser beam.

Figure 17:
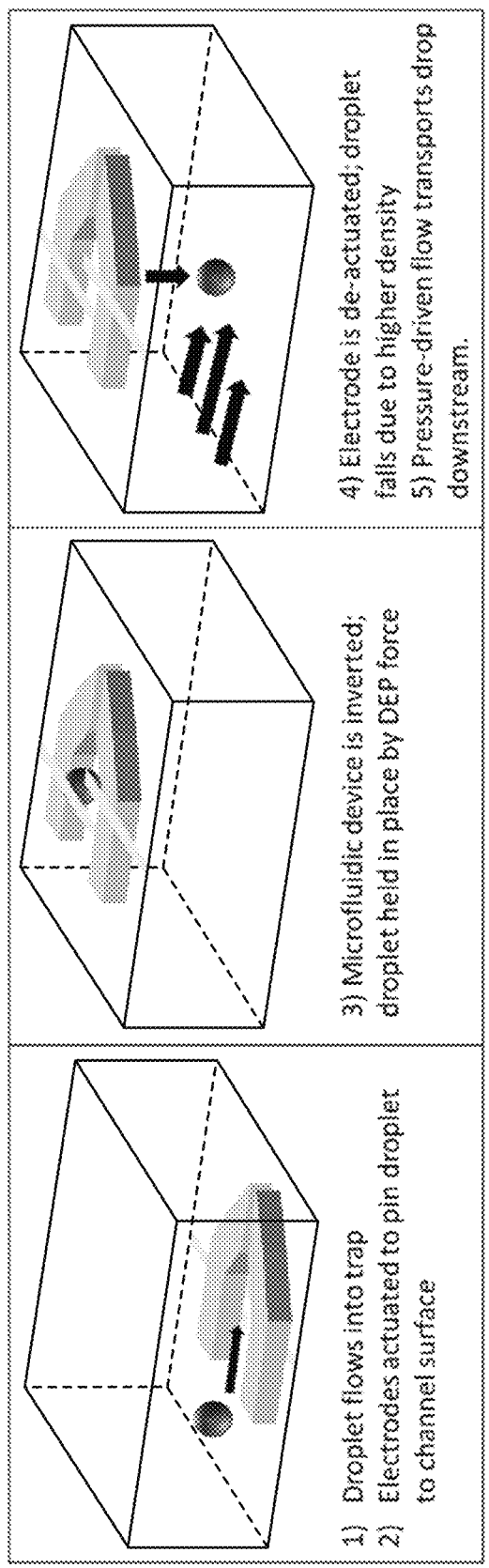
FIG. 17 depicts density-assisted separation for droplets that are denser than the continuous phase, in accordance with some example embodiments.

Once removed from a trap, a droplet can be retrieved from the microfluidic device using a variety of mechanisms. Depending on the trap structure, forward flow through the microfluidic channel after droplet release may be sufficient to carry the droplet downstream past the trap. For other trap geometries, this method may result in re-trapping of the released droplet. In these situations, there are several mechanisms that can be employed to release the trapped droplets after actuation, including the following:

(1) Density-assisted separation—by constructing a microfluidic channel that is taller than the diameter of a droplet and the trap structures, the droplet may be manipulated vertically above or below the trap structures. Depending on the ratio of the density of the droplet or particle and continuous phase around the droplet or particle, the droplet may settle to the bottom of the microfluidic channel or float to the top. The procedure to employ density-assisted separation involves trapping the droplet, then actuating an electrode or set of electrodes above or below the droplet to pin them to either the top or bottom surface of the channel, depending on whether the density dictates that the droplet floats or sinks. Before selection of the droplets for retrieval, the device is then inverted so that the trapping force provided by the electrodes holds the droplet to the opposite surface of the channel from the original orientation. Finally, selected droplets can be released from their traps simply by de-actuating the electrodes that address the droplets. See, for example FIG. 17. FIG. 17 depicts density-assisted separation for droplets that are denser than the continuous phase. The droplet flows into the trap of a microfluidic device and is held there when the electrodes are actuated (left diagram in FIG. 17). The microfluidic device is inverted but the droplet is still held in place due to, e.g. DEP force (middle diagram). When the electrode is de-actuated, the droplet falls due to having a higher density, and can be transported downstream due to, e.g., pressure driven flow (right diagram). If droplets were less dense than continuous phase (positive buoyancy), the droplet, traps, and electrodes would initially be at the ceiling of the microchannel before inverting the device.

Figure 18:
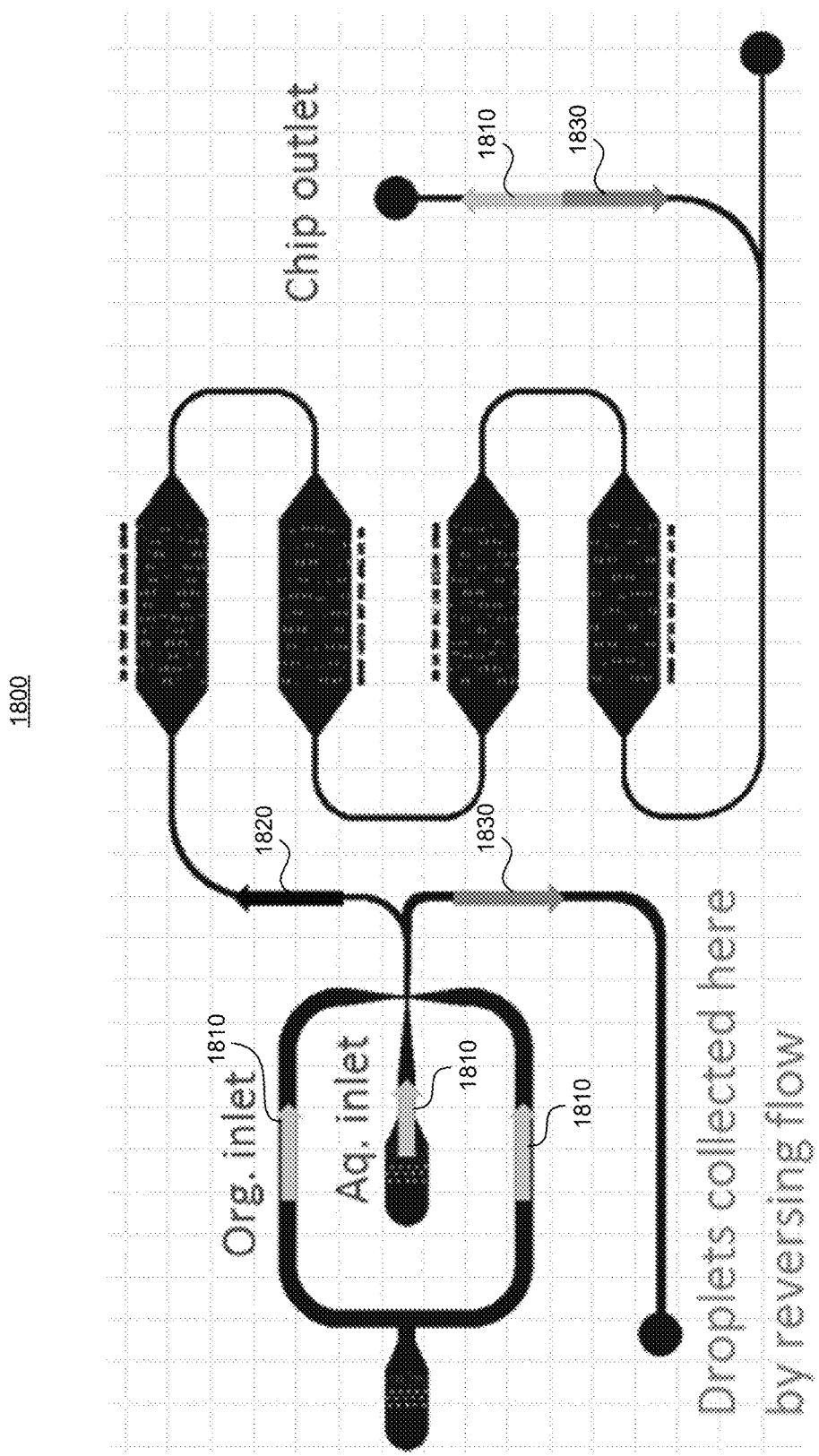
FIG. 18 depicts an example of a microfluidic design for collection of select droplets via flow reversal.

(2) Flow reversal—following any method for droplet release from traps, including de-actuation of electrodes, or a change in the frequency applied to the electrodes, flow through the microfluidic device can be reversed to collect these droplets without the risk of re-trapping. This is illustrated in an example device design in FIG. 18. FIG. 18 depicts a microfluidic design for collection of select droplets via flow reversal. Droplets are created and loaded into traps in the direction indicated by arrows 1810 and 1820. Once selected droplets have been removed from their traps, flow is reversed according to the direction arrows 1830 and these droplets can be collected at a separate outlet as shown in the diagram above.

Electrical Impedance Feedback for Optical-Free Droplet Creation

Microdroplet generation may involve a feedback loop in determining if the generated droplets have acceptable criteria (e.g., size, length, volume, inter-droplet spacing, frequency, etc.). The feedback loop may include optical determination via a microscope or other optical device and adjusting the pumping flow rate and/or pressure for one or more fluidic phases. This feedback loop may be iterated until the droplets meet acceptable criteria as defined by one or more criteria. This practice may become impractical with the increase in the number of droplet generators (e.g., scaling up parallel droplet generators for high-throughput droplet studies or manufacturing processes). Automatic optical detection methods of droplet criteria can be employed to improve the process but may still rely on expensive optics and cameras that provide a limited field of view (i.e., would be a limit to the number of droplet generators that could be observed simultaneously), may provide relatively low-resolution, high noise data (depending on optics, camera pixel size, background noise, etc.), may require a camera with high shutter speed (<0.5 ms) and high frame rate (>2,000 fps) to capture fast-moving droplets without motion blur, and may require that every droplet generator be in good focus to ensure accurate droplet evaluation.

Measuring the electrical impedance of droplets can be included in an automated droplet generator that avoids issues related to optical detection methods. A two- or three-electrode system (see, e.g., FIG. 5) placed immediately after a droplet generator module can electrically measure all criteria needed to generate desired droplets. For example, the Coulter principle in a direct current (DC) or alternating current (AC) regime may be employed to determine droplet frequency (i.e., number of impedance pulses per second, with each pulse representing a droplet passing through the sense region), droplet size/volume (i.e., positive correlation with change in impedance from baseline with size/volume of droplet), velocity (i.e., how long the droplet takes to pass through the electrical sense region of known length), physical length (i.e., how long the droplet takes to pass through the sense region at a known velocity and/or flow rate), and inter-droplet spacing (i.e., time between the exit of one droplet from the sense region and the entrance of a subsequent droplet, multiplied by the average velocity of the droplets). The disclosed electrical impedance method provides more information related to the characteristics and contents of multiple emulsions. The mechanical characteristics of a single emulsion droplet (e.g., size, spacing, frequency, etc.) and some internal characteristics (e.g., conductivity, pH, electrical permittivity, etc.) can be determined with low frequency impedance measurement of the droplet. For multiple emulsion droplets (e.g., capsules), the shell of the outside emulsion may block low frequency interrogation of the contents of the interior emulsion(s), providing only the mechanical characteristics of the capsule. The shell may be electrically shorted at higher frequencies, thereby providing access to the electrical characteristics of the interior emulsion(s) (e.g., conductivity, pH, electrical permittivity, etc.). Electrical shorting can occur by simply increasing the interrogation frequency past a point that the shell material cannot electrically polarize fast enough to shield the electric field from the droplet's interior. This phenomenon is called dielectric relaxation or dispersion and determined by a shell's dielectric properties. Impedance analysis within a droplet is now possible since electrical current can now flow within the droplet's interior. The electrical characteristics may be correlated to physical characteristics within each emulsion (whether single or multiple), such as density and bioparticle/nanoparticle concentration. Such a scheme can also be used to determine the thickness of the particle's shell, or the size of the core of these particles, and can improve the process and quality control for large-scale, automated production of these particles.

Figure 19:
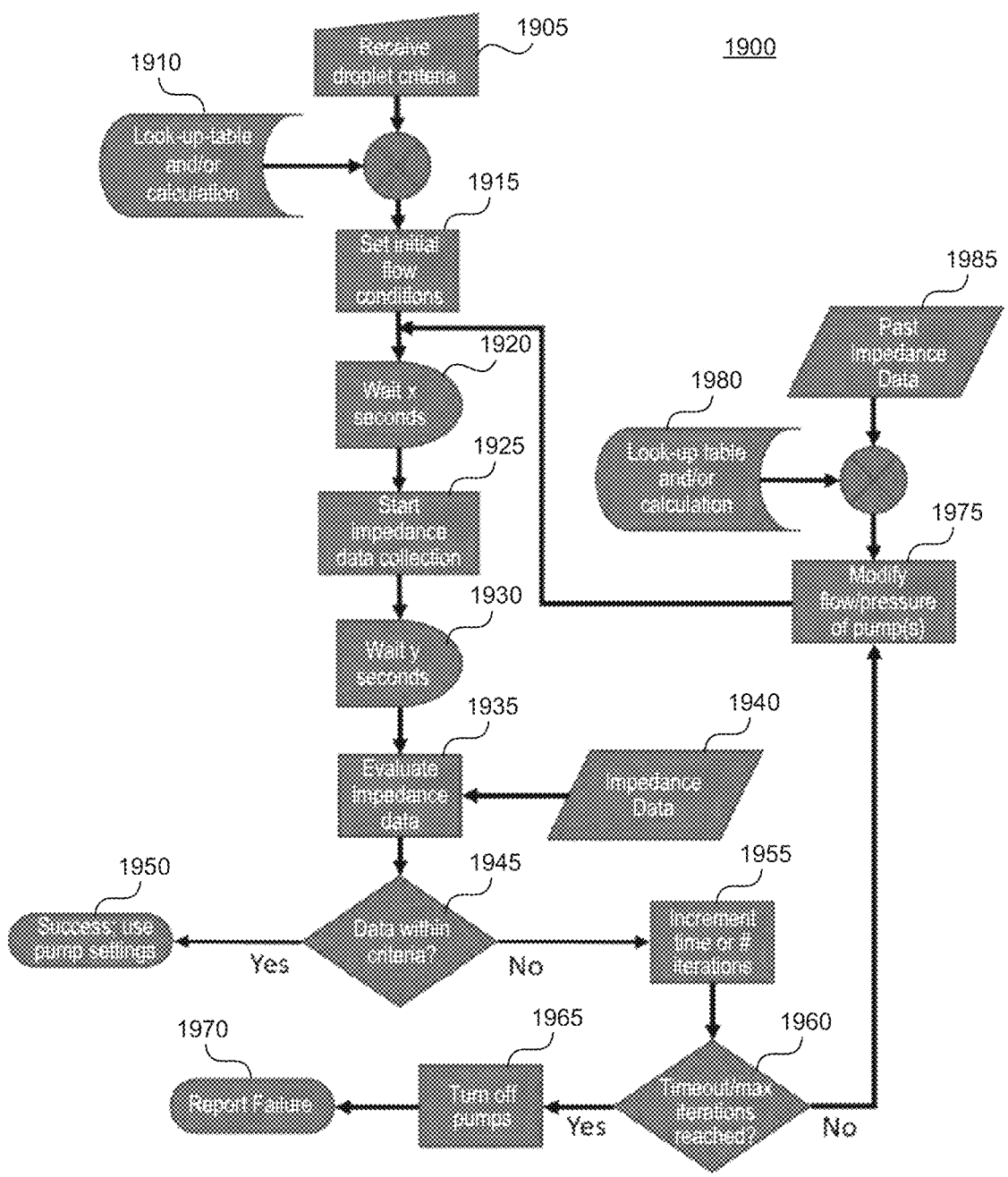
FIG. 19 depicts a set of operations for adjusting pump flow and/or pressure to generate droplets within predetermined criteria, in accordance with some example embodiments.

FIG. 19 at 1900 depicts an example of set of operations 1900 for generating droplets within predetermined criteria. For example, the predetermined criteria may include a droplet impedance, droplet size (e.g., diameter, length, volume), droplet generation frequency, velocity, and/or droplet-electrode physical contact duration. A similar process can be used to ensure that droplets continue to be within the desired criteria over the duration of an experiment after initial success (e.g., mitigating for experimental drift, possible clogging, modified droplet/surface dynamics, etc.).

At 1905, droplet criteria are received. At 1915 initial flow conditions are set using the received droplet criteria (from 1905) and a look-up table and/or calculation based an algorithm (from 1910). At 1920, the process waits a for predetermined amount of time, x seconds. At 1925, impedance data collection is started. At 1930, the process waits for a predetermined amount of time, y seconds. At 1935, the collected impedance data is evaluated. For example, the collected impedance data can be compared to stored impedance data at 1940. At 1945, if the impedance data is within the received criteria, the process is complete and the pump settings are used. At 1955, if the impedance is not within the received criteria, the number of iterations or time is incremented. At 1960, if a timeout has occurred or a maximum number of iterations has been reached, the pumps are turned off at 1965, and a failure is reported at 1970. If no timeout or the maximum number of iterations has not been reached, the flow and/or pressure of the pump(s) is adjusted automatically through the user-controlled program. For example, if the droplet generation frequency is too high, the program will decrease the total flow rate of the pump(s) while keeping the flow ratio between the carrier phase and the droplet phase the same. In another example if the droplets are too large, the program will decrease the droplet-to-carrier flow rate ratio while still meeting the droplet velocity criterion. The pressure or flow is adjusted according to past impedance data at 1985 and from the look-up table and/or calculation from 1980. The modified pressure and/or flow is fed back to 1920 and the process from 1920 is repeated until either the impedance meets the criteria or a timeout/maximum number of iterations is reached.

FIG. 20 illustrates a set of operations for determining a droplet's characteristic in a microfluidic device in accordance with an example embodiment. At 2002, an electrical signal at one or more predetermined frequencies is provided to a first electrode of the microfluidic device, where the first electrode is positioned within a microfluidic channel configured to allow fluid including one or more droplets to pass through the microfluidic channel. At 2004, electrical signals from at least a second electrode of the microfluidic device are sensed. The second electrode is positioned within the microfluidic channel and is configured to produce an electrical signal upon making physical contact with, or upon being in close proximity to, a first droplet. At 2006, at least one impedance value is obtained based on the sensed electrical signals, and at 2008, at least one characteristic of the first droplet is determined based on the at least one impedance value.

It is evident that the disclosed technology includes many aspects and embodiments, and finds many applications that can benefit from generation, detection, and manipulation of droplets in a microfluidic environment. For example, one aspect of the disclosed technology relates to a microfluidic measurement device that includes a microfluidic device including a microfluidic channel that is configured to allow fluid including one or more droplets to pass through the microfluidic channel. The microfluidic device also includes a plurality of electrodes coupled to the microfluidic fluidic channel configured to make physical contact with, or to be in close proximity to, the one or more of the droplets. At least a first electrode from the plurality of electrodes is configured to receive an electrical signal at one or more frequencies. The microfluidic measurement device further includes a detector coupled to the first electrode and at least a second electrode from the plurality of electrodes. The detector is configured to sense electrical signals from the plurality of electrodes at the one or more frequencies as the one or more droplets make physical contact with, or come to within proximity to, the first or the second electrode, and to enable a determination of one or more impedance values associated with the sensed electrical signals.

In one example embodiment, the first electrode is configured to operate as an excitation electrode to receive an input signal from the electrical source and to exert a force onto the one or more droplets that pass through the microfluidic channel in a vicinity of the first electrode. Further, the second electrode is configured to operate as a sensing electrode to produce electrical signals in response to sensing of the one or more droplets that pass through the microfluidic channel in the vicinity of the second electrode. In one example embodiment, the first and the second electrodes are spaced apart at a predetermined distance that is selected based on at least a physical size of the one or more droplets. In another example embodiment, the predetermined gap is less than a diameter of at least one droplet of the one or more droplets. In still another example embodiment, the first and the second electrodes are positioned at a coplanar configuration within the microfluidic channel such that the first electrode and the second electrode are positioned at one side of the microfluidic channel. In yet another example, embodiment, the first and the second electrodes are positioned at a facing configuration within the microfluidic channel such that the first electrode and the second electrode are positioned at opposite sides of the microfluidic channel facing each other.

According to one example embodiment, the detector is coupled to the first, the second and the third electrodes to enable a determination of the one or more impedance values that include: an impedance value between the second and the first electrode, or an impedance value between the third and the second electrode. In another example embodiment, the microfluidic measurement device includes a processor and memory including processor executable code, where the processor executable code upon execution by the processor causes the processor to determine or analyze the one or more impedance values that correspond to sensing of the one or more droplets. In one example embodiment, the processor executable code upon execution by the processor causes the processor to identify the one or more droplets based on detected changes in the one or more impedance values. In yet another example embodiment, the processor executable code upon execution by the processor causes the processor to determine a composition of the one or more droplets.

In one example embodiment, the microfluidic measurement device includes at least two sets of electrodes, and the first set of electrodes includes the first and the second electrode that are positioned at a first location within microfluidic channel, and the second set of electrodes positioned at a second location within the microfluidic channel downstream from the first set of electrodes. In another example embodiment, each of the first and the second set of electrodes includes at least two electrodes. In yet another example embodiment, each of the first and the second set of electrodes has three electrodes. In still another example embodiment, the microfluidic channel includes a plurality of pillars positioned at different locations within the microfluidic channel and are configured to make physical contact with the one or more droplets as the one or more droplets flow though the microfluidic channel.

In another example embodiment, the detector is configured to sense the electrical signals from the first set of electrodes corresponding to sensing of a first droplet at the first location within the microfluidic channel, and from the second set of electrodes corresponding to sensing of the first droplet at the second location within the microfluidic channel. In one example embodiment, the electrical signals sensed from the first and the second locations enable a determination of an extraction process. In still another example embodiment, the one or more frequencies are in the range 1 kilohertz to 100 megahertz. In another example embodiment, the one or more impedance values include a magnitude, a phase, a value of a real component or a value of an imaginary component of the one or more impedance values. In yet another example embodiment, the microfluidic measurement device includes an electrical signal source operable at one or more frequencies and coupled to at least the first electrode.

In another example embodiment, the microfluidic measurement device includes a plurality of traps positioned in the microfluidic channel. In this example embodiment, the first electrode and the second electrode are part of a first trap of the plurality of traps, each trap is configured to trap a single droplet and arrest the trapped droplet's movement, and each trap is configured to allow the trapped droplet to make physical with or become close enough in proximity to be electrically detected by at least two electrodes in each trap. Additionally, at least one of the two electrodes is configured to receive the electrical signal at one or more frequencies, and the detector is configured to sense the electrical signals at the one or more frequencies from one or more traps to enable a determination of the one or more impedance values associated the trapped droplet or droplets in the at least first trap.

In one example embodiment, the at least two electrodes in each trap are positioned at an angle with respect to each other such that one end of each trap has a larger opening compared to the other end of the trap. In another example embodiment, the plurality of traps is configured to include a plurality of rows and columns to allow a plurality of droplets that flow through the microfluidic channel be intercepted by the plurality of traps. In yet another example embodiment, at least one trap is configured to arrest the trapped droplet's movement based on a received alternating current (AC) or direct current (DC) electric field. In still another example embodiment, at least one trap is configured to release the trapped droplet based on a received alternating current (AC) or direct current (DC) electric field.

According to one example embodiment, the microfluidic device includes a processor and memory including processor executable code, where the processor executable code upon execution by the processor causes the processor to determine or analyze the one or more impedance values that correspond to the trapped droplet or droplets. In one example embodiment, the processor executable code upon execution by the processor causes the processor to determine, using the one or more impedance values, (a) a size of the trapped droplet, (b) a number of trapped droplets having a particular size, or (c) a content of the trapped droplet or droplets. In another example embodiment, the processor executable code upon execution by the processor causes the processor to selectively actuate or de-actuate any one of the plurality of traps. In still another example embodiment, the microfluidic device includes a demultiplexer configured to allow each trap to be selectively controlled by the processor. In yet another example embodiment, the one or more impedance values include a magnitude, a phase, a value of a real component or a value of an imaginary component of the one or more impedance values Another aspect of the disclosed technology relates to a microfluidic device that includes a microfluidic channel configured to allow fluid including one or more droplets to pass through the microfluidic channel, and a plurality of traps positioned in the microfluidic channel. Each trap is configured to trap a droplet and arrest the trapped droplet's movement and is further configured to cause the trapped droplet to make physical and electrical contact with a first electrode and a second electrode in each trap. At least the first electrode is configured to receive an electrical signal at one or more frequencies. The microfluidic device also includes a detector coupled to at least the second electrode of each trap and configured to sense electrical signals at the one or more frequencies from the one or more traps to enable a determination of one or more impedance values associated therewith.

Another aspect of the disclosed technology relates to an apparatus for generating droplets that includes a microfluidic entrance analyzer including a microfluidic channel and a plurality of entrance electrodes, where the microfluidic channel has a first input and a first output, and the plurality of entrance electrodes are positioned between the first input and the first output. The apparatus for generating droplets also includes one or more microfluidic pumps coupled to the first input of the microfluidic channel and configured to control a flow speed of a liquid that travels in the microfluidic channel and a flow ratio of droplet-to-liquid in the microfluidic channel. The apparatus for generating droplets further includes an evaluator including a processor and a memory comprising processor executable instructions. The evaluator is electrically coupled to the entrance analyzer and to the one or more microfluidic pumps, and the processor executable instructions when executed by the processor cause the processor to receive and process one or more impedance values at the plurality of entrance electrodes associated with droplets that flow through the microfluidic channel and adjust the one or more microfluidic pumps according to one or more droplet criteria.

In one example embodiment, the apparatus for generating droplets includes an exit analyzer including a plurality of exit electrodes positioned to allow a determination of one or more impedance values associated with droplets that reach the microfluidic exit analyzer section of the microfluidic device. In another example, embodiment, the apparatus for generating droplets is configured to determine an entrance impedance between the plurality of entrance electrodes and an exit impedance between the plurality of exit electrodes. In yet another example, embodiment, the entrance impedance and the exit impedance are determined at a predetermined frequency in the range 1 kilohertz and 100 megahertz. In still another example embodiment, the one or more droplet criteria include a droplet size or a droplet velocity. In another example embodiment, the exit analyzer is configured to provide a feedback based on the one or more impedance values associated with droplets that reach the microfluidic exit analyzer. For example, the feedback is indicative that droplet formation has a poor quality. According to an example embodiment, determination of the one or more impedance values includes determining a peak impedance value and comparing the peak impedance value to known values associated with a particular composition of matter.

Another aspect of the disclosed technology relates to a method for determining a droplet's characteristic in a microfluidic device. Such a method includes providing an electrical signal at one or more predetermined frequencies to a first electrode of the microfluidic device, where the first electrode is positioned within a microfluidic channel that is configured to allow fluid including one or more droplets to pass through the microfluidic channel. The method further includes sensing electrical signals from at least a second electrode of the microfluidic device, where the second electrode is positioned within the microfluidic channel and configured to produce an electrical signal upon making physical contact with (or coming to within a close proximity to) a first droplet. The method additionally includes obtaining at least one impedance value based on the sensed electrical signals, and determining at least one characteristic of the first droplet based on the at least one impedance value.

In one example embodiment, at least one characteristic of the first droplet includes one of a size or a content of the droplet. In another example embodiment, the above noted method includes providing the electrical signal at a first frequency and determining one of the size or the content of the first droplet based on the at least one impedance value obtained at the first frequency, and providing the electrical signal at a second frequency and determining the other of the size or the content of the first droplet based on the at least one impedance value obtained at the second frequency. In another example embodiment, the first and the second electrode are part of a first set of electrodes, and the method further includes allowing the first droplet to travel through the microfluidic channel to reach a second set of electrodes, and obtaining at least one additional impedance value from electrical signals sensed from the second set of electrodes. In such an embodiment, determining the at least one characteristic of the first droplet includes determining an extraction associated with the first droplet based on impedance changes in the at least one additional impedance value obtained based on electrical signals sensed at the second set of electrodes compared to the at least one impedance value obtained based on electrical signals sensed at the first set of electrodes.

In another example embodiment, the impedance changes caused by changes in a resistance value are indicative of extraction of ions, the impedance changes caused by changes in a capacitance value are indicative of extraction of dipoles, and the impedance changes caused by changes in an inductance value are indicative of extraction of metals. In yet another example embodiment, the first and the second electrode are part of a first set of electrodes, the first set of electrodes further includes a third electrode, and obtaining the at least one impedance value includes obtaining one or both of: an impedance value between the second electrode and the first electrode, or an impedance value between the third electrode and the second electrode. In one example embodiment, each of the first and the second set of electrodes include at least three electrodes. In another example embodiment, obtaining the at least one impedance value includes obtaining one or more of: a magnitude, a phase, a value of a real component or a value of an imaginary component of the at least one impedance value.

According to another example embodiment, the microfluidic device comprises a plurality of traps and the first and the second electrodes are part of a first trap of the plurality of traps, where each trap is configured to arrest a movement of a droplet that makes physical contact with the trap. In this example embodiment, the above noted method further includes actuating at least the first trap to determine an impedance value of the trapped first droplet. In another example embodiment, the method includes de-actuating at least the first trap to release the trapped droplet.

Another aspect of the disclosed technology relates to a method for generating a plurality of droplets in a microfluidic device. Such a method includes (a) receiving droplet criteria indicative of specific characteristics of the plurality of droplets; (b) determining initial flow conditions in a microfluidic channel of the microfluidic device, where the microfluidic channel includes at least a first electrode and second electrode positioned in the microfluidic channel to allow determination of impedance values for droplets that flow through the microfluidic channel and come in physical contact with at least the second electrode; (c) obtaining impedance values associated with particles that come in physical contact with at least the second electrode; (d) determining whether the obtained impedance values meet the droplet criteria; and upon a determination that the obtained impedance values meet the droplet criteria, retaining the initial flow conditions as correct conditions for sustained generation of the plurality of droplet; (e) upon a determination that the obtained impedance values do not meet the droplet criteria, modifying the initial flow conditions based on new values of one or both of a flow rate or a pressure value, and repeating operations (c) though (e). In one example embodiment, upon a determination that the obtained impedance values do not meet the droplet criteria for a predetermined number of iterations, halting operations (a) through (e).

From the foregoing, it will be appreciated that specific embodiments of the invention have been described herein for purposes of illustration, but that various modifications may be made without deviating from the scope of the invention. Accordingly, the invention is not limited except as by the appended claims.

The subject matter described herein may be embodied in systems, apparatus, methods, and/or articles depending on the desired configuration. For example, the systems, apparatus, methods, and/or articles described herein can be implemented using one or more of the following: materials such as glass, metals, or any other mechanical material, electronic components such as transistors, inductors, capacitors, resistors, and the like, a processor executing program code, an application-specific integrated circuit (ASIC), a digital signal processor (DSP), an embedded processor, a field programmable gate array (FPGA), and/or combinations thereof. These various example embodiments may include implementations in one or more computer programs that are executable and/or interpretable on a programmable system including at least one programmable processor, which may be special or general purpose, coupled to receive data and instructions from, and to transmit data and instructions to, a storage system, at least one input device, and at least one output device. These computer programs (also known as programs, software, software applications, applications, components, program code, or code) include machine instructions for a programmable processor, and may be implemented in a high-level procedural and/or object-oriented programming language, and/or in assembly/machine language.

As used herein, the term "machine-readable medium" refers to any computer program product, computer-readable medium, computer-readable storage medium, apparatus and/or device (for example, magnetic discs, optical disks, memory, Programmable Logic Devices (PLDs)) used to provide machine instructions and/or data to a programmable processor, including a machine-readable medium that receives machine instructions. In the context of this document, a "machine-readable medium" may be any non-transitory media that can contain, store, communicate, propagate or transport the instructions for use by or in connection with an instruction execution system, apparatus, or device, such as a computer or data processor circuitry. A computer-readable medium may comprise a non-transitory computer-readable storage medium that may be any media that can contain or store the instructions for use by or in connection with an instruction execution system, apparatus, or device, such as a computer. Furthermore, some of the embodiments disclosed herein include computer programs configured to cause methods as disclosed herein (see, for example, FIGS. 7, 8, 10-13, 15, 16 and/or the process 1900 in FIG. 19).

Although a few variations have been described in detail above, other modifications or additions are possible. In particular, further features and/or variations may be provided in addition to those set forth herein. Moreover, the example embodiments described above may be directed to various combinations and subcombinations of the disclosed features and/or combinations and subcombinations of several further features disclosed above. In addition, the logic flow depicted in the accompanying figures and/or described herein does not require the particular order shown, or sequential order, to achieve desirable results. Other embodiments may be within the scope of the following claims.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A microfluidic measurement device, comprising:
  a microfluidic device comprising:
    a microfluidic channel configured to allow fluid including one or more droplets to pass through the microfluidic channel;
    a planar array of electrodes coupled to the microfluidic channel including a first electrode, a second electrode, and a third electrode;
    a signal generator coupled to the second electrode;
    a detector coupled to the first electrode and the third electrode, the detector configured to sense a first electrical signal from the first electrode and produce a first output and sense a second electrical signal from the second electrode and produce a second output; and
    an impedance measuring device coupled to the first output, the second output and the second electrode to determine a first impedance between the first electrode and the second electrode and a second impedance between the third electrode and the second electrode, wherein:
      the second electrode is configured to operate as an excitation electrode to receive an input signal from an electrical source and to exert a force onto the one or more droplets that pass through the microfluidic channel in a vicinity of the second electrode,
      the first and third electrodes are configured to operate as sensing electrodes to produce the electrical signals in response to sensing of the one or more droplets that pass through the microfluidic channel in the vicinity of the first and third electrodes,
      the first, second, and third electrodes are positioned in a coplanar configuration within the microfluidic channel such that the first, second, and third electrodes are positioned at one side of the microfluidic channel,
      the first electrode and the second electrode are part of a first trap of the plurality of traps, each trap is configured to trap a single droplet and arrest the trapped droplet's movement, and
      the detector is configured to sense the electrical signals from at least the first trap to enable a determination of the impedance values associated with the trapped droplet or droplets in the at least the first trap.

2. The microfluidic measurement device of claim 1, wherein the first, second, and third electrodes are spaced apart at a predetermined distance that is selected based on at least a physical size of the one or more droplets.

3. The microfluidic measurement device of claim 2, wherein the predetermined distance is less than a diameter of at least one droplet of the one or more droplets.

4. The microfluidic measurement device of claim 1, including a processor and memory including processor executable code, wherein the processor executable code upon execution by the processor causes the processor to determine or analyze the one or more impedance values that correspond to sensing of the one or more droplets.

5. The microfluidic measurement device of claim 4, wherein the processor executable code upon execution by the processor causes the processor to identify the one or more droplets based on detected changes in the one or more impedance values.

6. The microfluidic measurement device of claim 4, wherein the processor executable code upon execution by the processor causes the processor to determine a composition of the one or more droplets.

7. The microfluidic measurement device of claim 1, including at least two sets of electrodes, the first set of electrodes comprising the first, second, and third electrodes that are positioned at a first location within microfluidic channel, and the second set of electrodes positioned at a second location within the microfluidic channel downstream from the first set of electrodes.

8. The microfluidic measurement device of claim 7, wherein the second set of electrodes includes at least two electrodes.

9. The microfluidic measurement device of claim 7, wherein each of the first and the second set of electrodes has three electrodes.

10. The microfluidic measurement device of claim 7, wherein the microfluidic channel includes a plurality of pillars positioned at different locations within the microfluidic channel and configured to make physical contact with the one or more droplets as the one or more droplets that flow though the microfluidic channel.

11. The microfluidic measurement device of claim 7, wherein the detector is configured to sense the electrical signals from the first set of electrodes corresponding to sensing of a first droplet at the first location within the microfluidic channel, and from the second set of electrodes corresponding to sensing of the first droplet at the second location within the microfluidic channel.

12. The microfluidic measurement device of claim 11, wherein the electrical signals sensed from the first and the second locations enable a determination of an extraction process.

13. The microfluidic measurement device of claim 1, wherein the one or more frequencies are in the range 1 kilohertz to 100 megahertz.

14. The microfluidic measurement device of claim 1, wherein the first and second impedance values include a magnitude, a phase, a value of a real component or a value of an imaginary component of the one or more impedance values.

15. The microfluidic measurement device of claim 1, wherein the signal generator is operable at multiple.

16. The microfluidic measurement device of claim 1, comprising a plurality of traps positioned in the microfluidic channel, wherein:
each trap is configured to allow the trapped droplet to make physical contact with or become close enough in proximity to be electrically detected by at least two electrodes in each trap, wherein at least one of the two electrodes is configured to receive the electrical signal at one or more frequencies.

17. The microfluidic measurement device of claim 16, wherein the at least two electrodes in each trap are positioned at an angle with respect to each other such that one end of each trap has a larger opening compared to the other end of the trap.

18. The microfluidic measurement device of claim 16, wherein the plurality of traps is configured to include a plurality of rows and columns to allow a plurality of droplets that flow through the microfluidic channel be intercepted by the plurality of traps.

19. The microfluidic measurement device of claim 16, wherein at least one trap is configured to arrest the trapped droplet's movement based on a received alternating current (AC) or direct current (DC) electric field.

20. The microfluidic measurement device of claim 16, wherein at least one trap is configured to release the trapped droplet based on a received alternating current (AC) or direct current (DC) electric field.

21. The microfluidic measurement device of claim 16, including a processor and memory including processor executable code, wherein the processor executable code upon execution by the processor causes the processor to determine or analyze the one or more impedance values that correspond to the trapped droplet or droplets.

22. The microfluidic measurement device of claim 21, wherein the processor executable code upon execution by the processor causes the processor to determine, using the one or more impedance values, (a) a size of the trapped droplet, (b) a number of trapped droplets having a particular size, or (c) a content of the trapped droplet or droplets.

23. The microfluidic measurement device of claim 21, wherein the processor executable code upon execution by the processor causes the processor to selectively actuate or de-actuate any one of the plurality of traps.

24. The microfluidic measurement device of claim 23, including a demultiplexer configured to allow each trap to be selectively controlled by the processor.

25. The microfluidic measurement device of claim 16, wherein the one or more impedance values include a magnitude, a phase, a value of a real component or a value of an imaginary component of the one or more impedance values.

* * * * *